United States Patent [19]
Kano et al.

[11] Patent Number: 5,359,513
[45] Date of Patent: Oct. 25, 1994

[54] METHOD AND SYSTEM FOR DETECTION OF INTERVAL CHANGE IN TEMPORALLY SEQUENTIAL CHEST IMAGES

[75] Inventors: Akiko Kano; Kunio Doi, both of Willowbrook, Ill.

[73] Assignee: Arch Development Corporation, Chicago, Ill.

[21] Appl. No.: 981,471

[22] Filed: Nov. 25, 1992

[51] Int. Cl.$^5$ .................. G06F 15/00; G06K 9/00
[52] U.S. Cl. ................... 364/413.23; 364/413.13; 382/6
[58] Field of Search ............ 364/413.13, 413.23, 364/413.29; 382/6, 44, 54

[56] References Cited

U.S. PATENT DOCUMENTS

| | | | |
|---|---|---|---|
| 4,641,352 | 2/1987 | Fenster et al. | 382/6 |
| 4,644,582 | 2/1987 | Morishita et al. | 382/6 |
| 4,710,875 | 12/1987 | Nakajima et al. | 364/413.23 |
| 4,899,393 | 2/1990 | Morishita et al. | 382/6 |

Primary Examiner—Donald E. McElheny, Jr.
Assistant Examiner—Khai Tran
Attorney, Agent, or Firm—Oblon, Spivak, McClelland, Maier & Neustadt

[57] ABSTRACT

A computerized scheme for the analysis of digitized medical images which provides enhancement of interval changes occurring in a pair of temporally sequential images. In the method and apparatus of the invention, a pair of images are digitized and then are subjected to image registration including a nonlinear warping of one of the images so that corresponding locations in the two images are aligned with each other. Subsequent to image registration, a subtraction process is performed in order to generate a difference between the warped and unwarped images. In this manner, slight opacities which are only present in the later image may be detected based on the subtraction of the registered images.

14 Claims, 30 Drawing Sheets

FIG. 4
SHAPES OF TEMPLATE ROIs AND SEARCH AREA ROIs
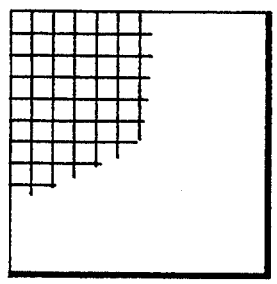
SQUARE
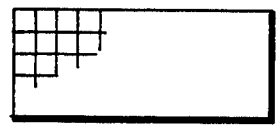
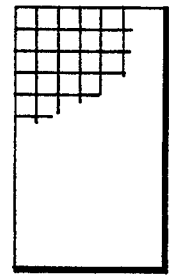
RECTANGLE
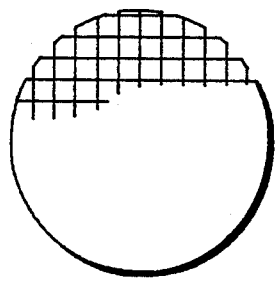
CIRCLE
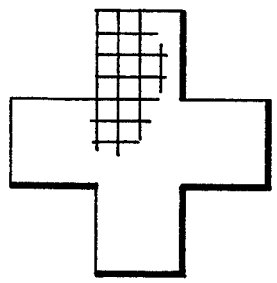
CROSS
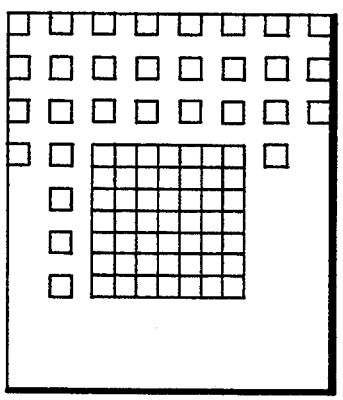

NONLINEAR WARPING OF X,Y-COORDINATES

TRANSFORMATION

WARPING (X+ X,Y+ Y)

(X,Y)

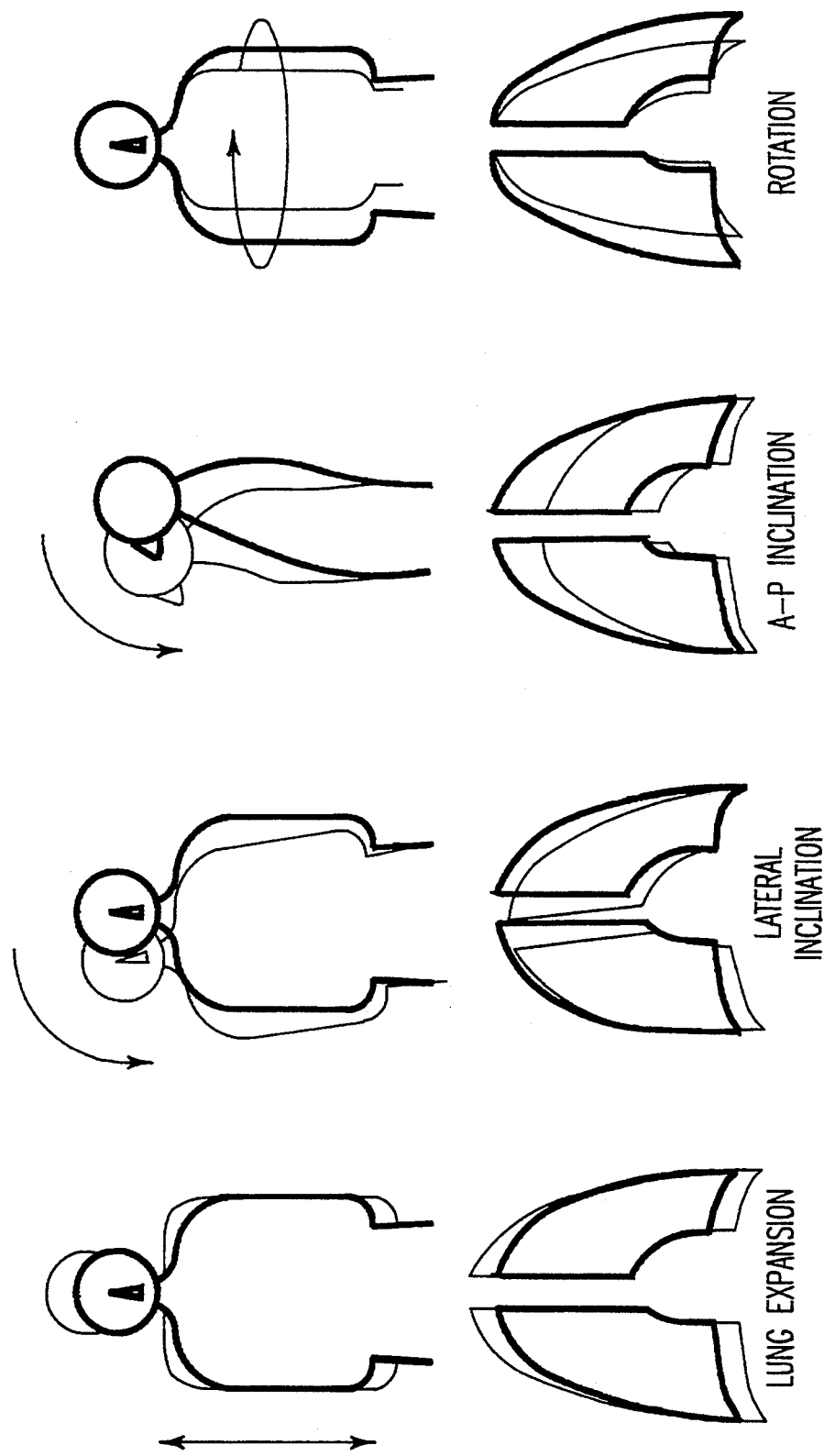
FIG. 12 CAUSE OF MISREGISTRATION

METHOD AND SYSTEM FOR DETECTION OF INTERVAL CHANGE IN TEMPORALLY SEQUENTIAL CHEST IMAGES

The present invention was made in part with U.S. government support under Grant No. 2 ROI CA24806-11 from the Department of Health and Human Services and the National Cancer Institute. The U.S. government has certain rights in the invention.

BACKGROUND OF THE INVENTION

1. Field of the Invention

The present invention relates to the field of computerized analysis of digitized medical images such as chest X-ray images, for example, which is used for the enhancement of subtle interval changes occurring between a pair of images corresponding to a given patient, one of which has been produced prior to the other so that changes between the two images can be detected using digital image processing techniques.

2. Discussion of the Related Art

In clinical situations, comparison with a previous chest radiograph of the same patient has been considered important. Most of postero-anterior (P-A) chest radiographs are observed side-by-side with previous radiographs. Comparison readings help radiologists to identify abnormalities and to determine their significance. They are also important in detecting temporal changes in known lesions so that the effect of treatment can be evaluated. However, important interval changes can be missed by radiologists even when they observe serial chest radiographs, as has been described in Greene, "Missed Lung Nodules . . . ", *Radiology*, Vol. 182, pp. 1, 8–9, 1992, and Austin, "Missed Bronchogenic Carcinoma . . . ", *Radiology*, Vol. 182, p. 1, 115–122. The reason for such errors is partly due to the difficulty in comparing two radiographs by scanning back and forth between them, and also due to differences in density, contrast or patient positioning between the two radiographs. Interval changes of a patient having a number of abnormalities often can be overlooked because some abnormalities are camouflaged by other abnormalities not showing any change. Therefore, it is important to obtain information related to interval changes in temporally sequential chest radiographs to alert radiologists and improve the possibilities of detecting important changes in pathology. An interval change is defined here as a pathological change which has occurred after the previous examination and before the current examination.

In general, chest radiographs are hardly reproducible in terms of patient positioning, x-ray projection, and other exposure conditions. Also, respiration and cardiac pulsation of a patient will usually be at different phases for the two images, which results in changes in the size and the shape of the lungs, diaphragm and heart. Therefore, an image registration technique is needed so that a pixel on one image can be subtracted from that corresponding to the identical anatomic structure on the other image. In addition, the fact that radiographs correspond to two-dimensional projections of three-dimensional objects prevents the accurate registration of images in a simple manner. FIG. 12 illustrates various sources of misregistration in pairs of temporally sequential P-A chest images, which have been determined by studying more than 40 pairs of images. Most pairs have misregistration due to a combination of these sources.

SUMMARY OF THE INVENTION

Accordingly, it is an object of the present invention to provide a computerized method and apparatus for improving diagnostic accuracy using an enhancement scheme for detection of interval changes between temporally sequential digitized medical images.

A related object is to provide a computerized method and apparatus for performing image registration processing of a pair of temporally sequential chest images by performing nonlinear warping of one of the images and then performing a subtraction process between the warped image and the other image.

A further object is to provide a computerized method and apparatus for performing image registration and subtraction where nonlinear warping of one of a pair of temporally sequential images of a given patient is based on a local matching technique applied to a number of small regions of interest (ROIs) in the two images.

A still further object of the present invention is to provide a computerized method and apparatus for enhancement and detection of lung disease which uses an image registration technique for matching a pair of temporally sequential chest images and then performing a subtraction process between the two images where the image registration technique involves the selection of a number of small ROIs on the images based on data obtained by image analysis of the two chest images.

Yet another object of the invention is to provide a method and apparatus for the detection of interval changes between a pair of temporally sequential medical images using a nonlinear warping technique in order to perform image registration between the two images based on the determination of mapping shift values, which values represent the result of a local matching technique applied to a number of small ROIs in the two temporally sequential images.

Another object of the invention is to provide a method and apparatus for performing a subtraction between a pair of digitized medical images in order to enhance and detect possible abnormal regions on the images where the two images are matched with each other on the basis of a nonlinear warping technique which is applied to one of the two images in order to allow subtraction of the digitized images, such that the nonlinear warping technique is performed by using a mapping of shift values between corresponding locations on the two images and the mapping of the shift values is based on two-dimensional polynomial functions which are fitted to the shift values.

Another object of the invention is to provide a method and apparatus for performing image registration and subtraction between a pair of temporally sequential images which employs a weighted fitting technique for fitting polynomial functions to a plurality of shift values where the weighting factors determine the extent of contribution of the polynomial fitting for each of the shift values.

Another object of the present invention is to provide a method and apparatus for implementing a computerized scheme which enables the enhancement and detection of abnormalities in a pair of temporally sequential medical images which uses a weighted fitting technique for fitting polynomial functions to a plurality of shift values representing the amount of misregistration between corresponding locations in the two images where the fitting technique is a weighted technique having weighting factors determined on the basis of information related to a local matching process and/or the results of image data analysis.

In order to accomplish the above and other objects, the present invention involves a computerized scheme whereby a pair of chest images are produced using a known X-ray technique which images are then digitized and subjected to processing by a digital computer. The technique includes the registration of the two images in order for corresponding locations in the images to be aligned so that subtraction processing can then be performed. This subtraction of the two images will enhance subtle changes between the two images which may be indications of abnormality, such as interstitial disease, tumors, etc. In order to perform the registration of the two images, a nonlinear warping is applied to one of the images in order to provide the required alignment between corresponding locations in the two images. The nonlinear warping scheme is based on a local matching technique of a number of small regions of interest (ROIs) selected on the basis of detected information concerning the anatomic structures of the chest images. The local matching technique is represented by a mapping of the shift values between the corresponding locations in the two images, where the mapping of shift values is subjected to a curve fitting technique which uses weighting factors based on the amount of local matching, or the results of image data analysis performed on the ROIs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates the various shapes of template and search area ROIs which can be used for performing the local matching technique;

FIG. 12 illustrates the various causes of misregistration between a pair of temporally sequential chest images;

DETAILED DESCRIPTION OF THE PREFERRED EMBODIMENTS

Figure 1A:
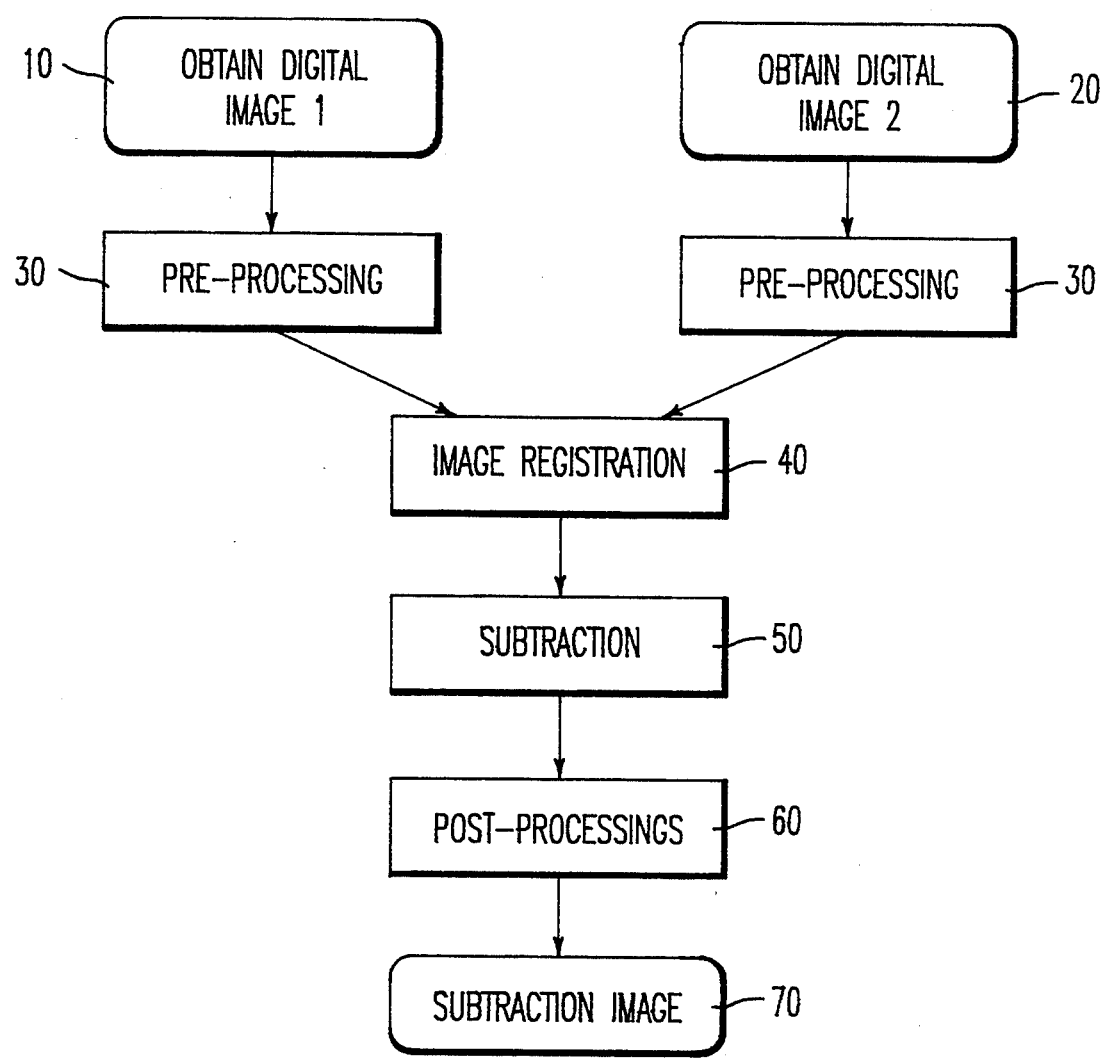
FIG. 1A shows the overall scheme of image registration and subtraction processing according to the present invention.

Referring now to the drawings, and more particularly to FIG. 1A thereof, there is shown a flowchart illustrating the basic concept according to the present invention. As shown, the method includes the digitization of a pair of first and second images (steps 10, 20), image registration (step 40) and then subtraction (step 50) of the images. Instead of digitized radiographs, digital chest images obtained directly with a storage phosphor detector system or a CCD detector system can be used. The steps 30, 60 shown in italics are preferable but are not necessary for carrying out the method of the invention. The subtraction image is output in step 70.

Figure 1B:
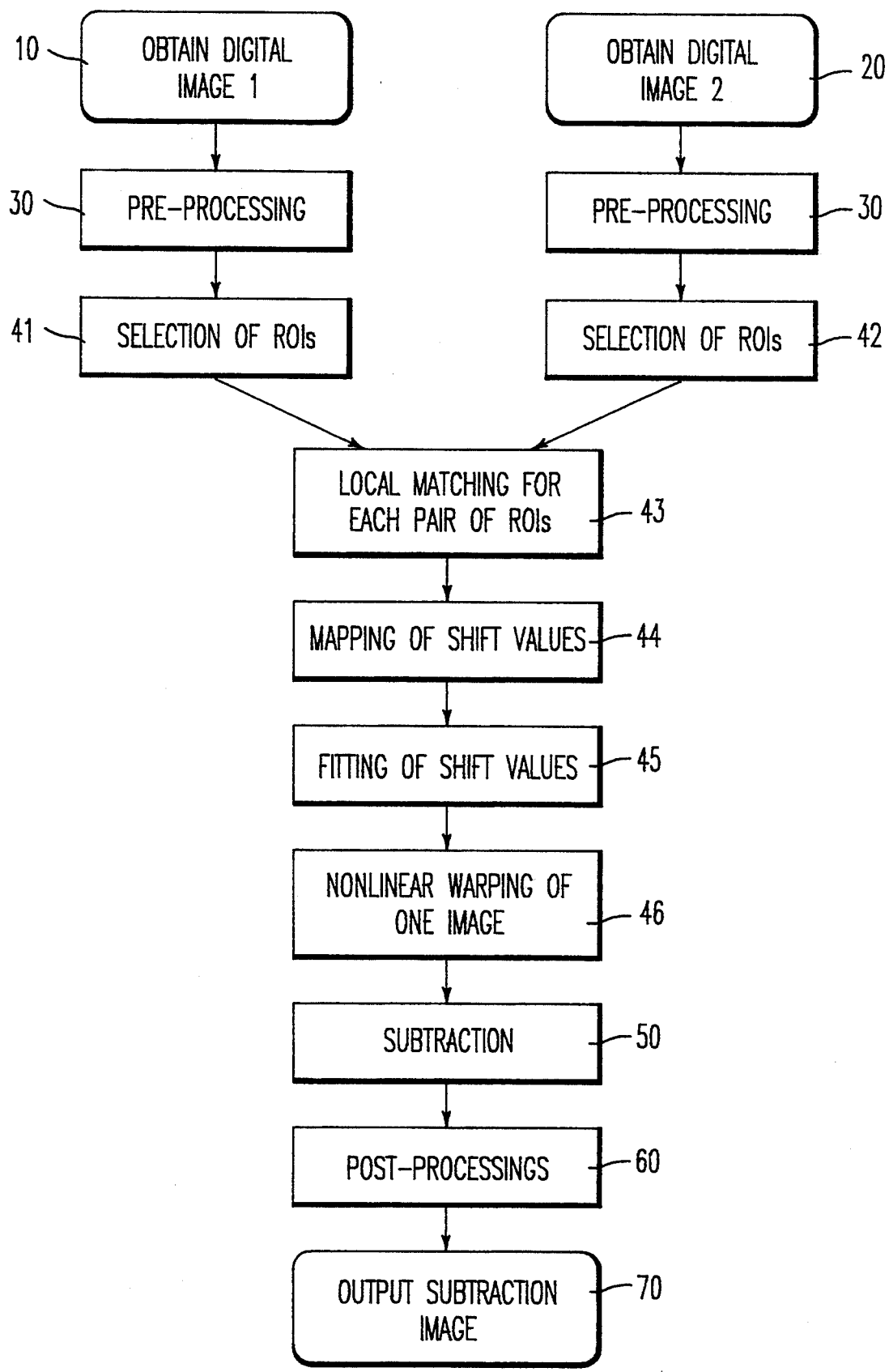
FIG. 1B shows the basic steps according to the invention from the digitization of the two chest images to the output of the subtraction image.

FIG. 1B illustrates in more detail the overall scheme for performing interval change enhancement between a pair of temporally sequential chest images, including the steps of digitization (steps 10, 20) of a pair of chest radiograph images, selection of a number of small regions of interest (ROIs) (steps 41, 42) and then image registration using the selected ROIs. Image registration includes the use of a local matching technique (step 43) which is applied to each pair of corresponding ROIs in the two images, and the mapping of shift values (step 44) representative of the amount of local matching between each corresponding pair of ROIs. A curve fitting technique (step 45) is applied to the mapped shift values, and nonlinear warping (step 46) of one of the two images is performed based on the results of the curve fitting analysis. Finally, subtraction (step 50) of the warped and unwarped images is performed for each pair of corresponding ROIs. The subtraction image is then output (step 70) to enable viewing by a radiologist who can then compare the results obtained by the subtraction processing with the results obtained by side-by-side viewing of the temporally sequential images. Steps 30, 60 are preferred but not essential to the invention.

Figure 1C:
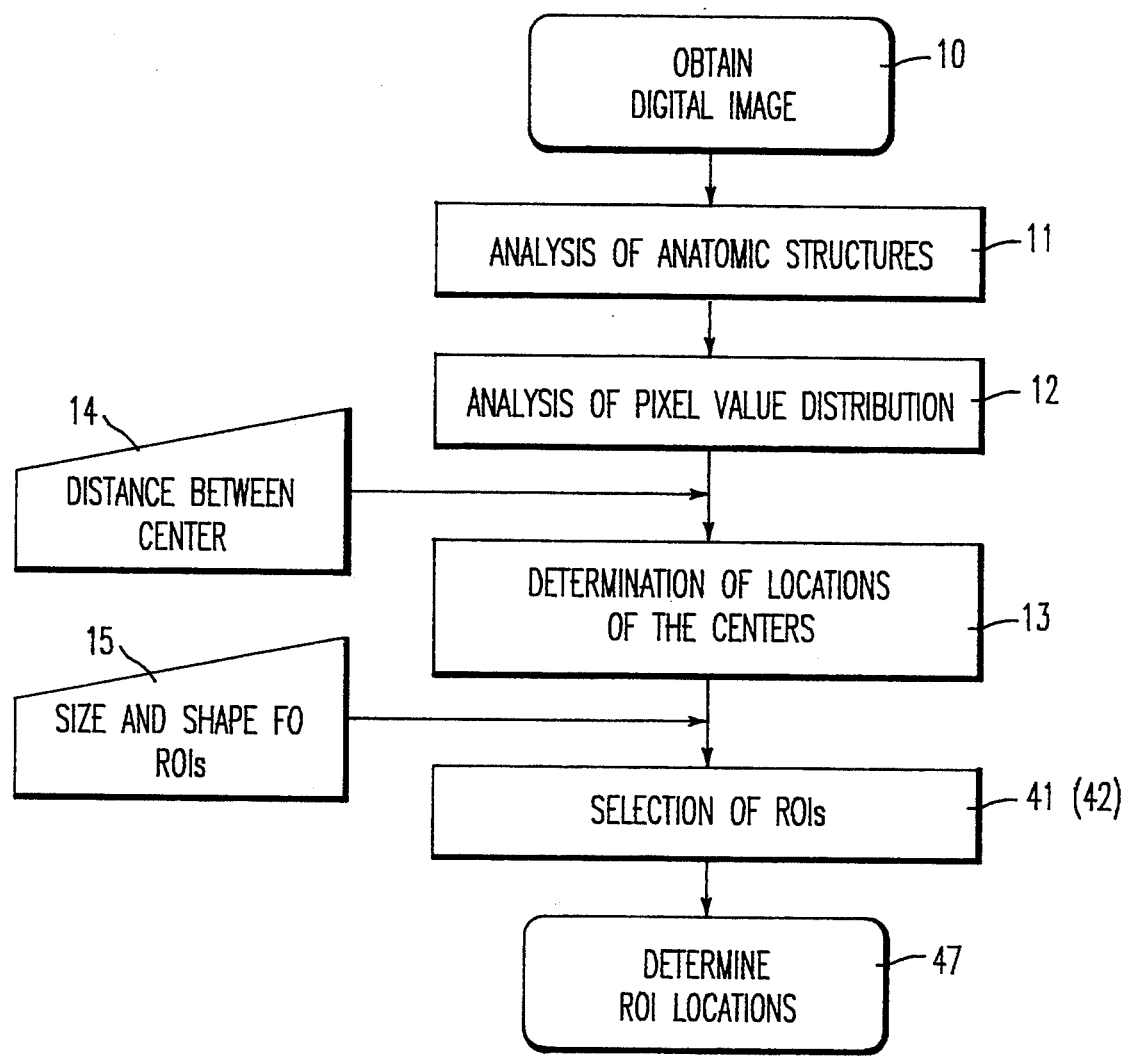
FIG. 1C illustrates the method for performing selection of the ROIs.

FIG. 1C illustrates the process of selection of the ROIs (steps 41, 42) in the two digitized images, which is based on the analysis of the anatomic structures (step 11, i.e., ribcage edge location, etc.) of the chest images and a determination of the distance between the centers of the ROIs (step 14) and a determination of the locations of these centers (step 13). The size and shape of the ROIs are also selected (step 15). The location of the ROIs (step 47) is thus determined. Step 12 is also an optional step which is not required for the invention.

Figure 1D:
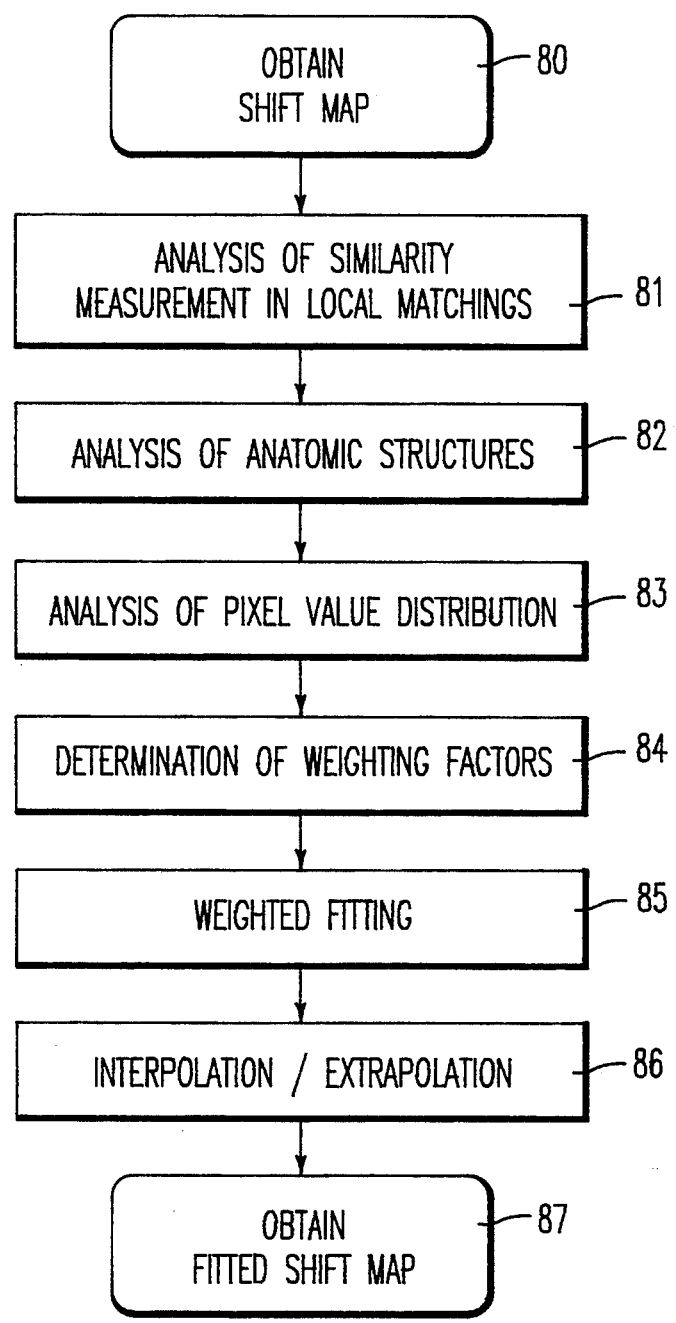
FIG. 1D represents the individual steps performed for the curve fitting technique for application to the mapped shift values.
Figure 2B:
FIG. 2 shows the overlying search areas and templates used with the first and second digitized images.
Figure 2D:
Figure 2A:
Figure 2C:

The shift mapping technique used with the local mapping scheme according to the present invention is shown in FIG. 1D. As shown, a shift map is determined (step 80) and the weighting factors used in the weighted curve fitting technique are determined (step 84) after the analysis of similarities between the template ROIs and the search area ROIs and based on the analysis of the anatomic structures and the pixel value distribution in the chest images. After the weighted fitting is performed (step 85), interpolation/extrapolation techniques (step 86) can be employed in order to estimate values which are not directly calculated in the shift mapping calculations. A fitted shift map is then produced (step 87). The steps 81–84 are optional.

The local matching technique involves the selection of ROIs in the two images, i.e., the template ROI image and the search area ROI image. The template ROI is moved within the search area ROI to determine the best match of the template ROI relative to the search area ROI of the other image. The search area ROIs and the template ROIs are automatically selected by the computer, as shown in FIG. 2. In FIG. 2, the large number of dotted areas represent the centers of the ROIs in each image.

Image Registration Technique

The basic concept of the image registration technique used in the present invention employs nonlinear distortion (warping) of one of the images in order to obtain improved registration between the two images so that subtraction processing can be carried out. The nonlinear warping is performed based on local matchings of a number of small regions of interest (ROIs) at corresponding locations in the two images. To perform the local matching process, a small template ROI is selected in one image. In the other image, a search area ROI is selected where a subregion which matches the template subimage will be searched for within the search area. In other words, the subregion which is most similar to the template subimage in the first image must exist within the search area in the other image. The search area can be the whole image area, but it is preferable to select a search area ROI which is slightly larger than the template ROI approximately at the corresponding location in terms of anatomic structures, in order to obtain higher accuracy and shorter processing time.

It is preferable to select the ROIs mainly in lung areas including ribcages since the most important diagnostic information is located in the lung areas. Location of lung areas can be determined by known image analysis schemes which can detect specific anatomic structures such as ribcage edges, location of the diaphragm, heart area, and mediastinum. These methods are described in U.S. Pat. No. 4,851,984, for example.

Locations of the centers of templates and search areas can also be determined based on the above-mentioned image analysis schemes. A center of a search area should be located in approximately the same position in terms of anatomy as that of the corresponding template. Centers of template ROIs and those of search area ROIs can be selected independently using the above mentioned image analysis techniques for each image separately. Alternatively, it is possible to select template ROIs in one image in the same way, and then locate the centers of search areas in the other image by globally shifting and/or rotating the center points of the templates, based on the information of the relative location of certain anatomic structures such as ribcage edges, the midline of the lungs, or the top of the lungs. This method can be more accurate when it is applied independently for some segments in the lung area, for example, independently for the right lung area and for the left lung area separated by a midline, as shown in FIG. 2. FIG. 2 illustrates that the centers of the templates are selected in the ribcage area as are the centers of the corresponding search areas obtained by shifting the centers of templates based on the relative locations of the crossing point of the midline and the topline of the lungs.

Figure 3A:
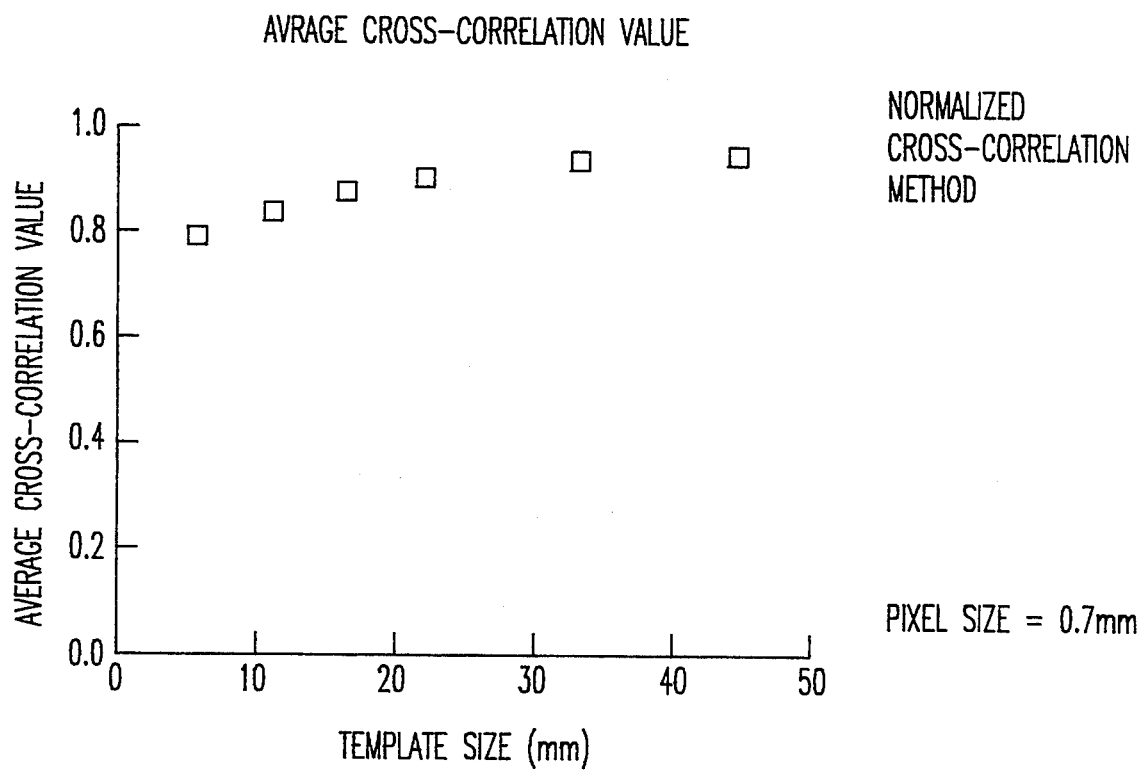
FIG. 3 shows a pair of graphs illustrating the relationships between the template size and the average cross-correlation value and processing time for performing local matching.
Figure 3B:
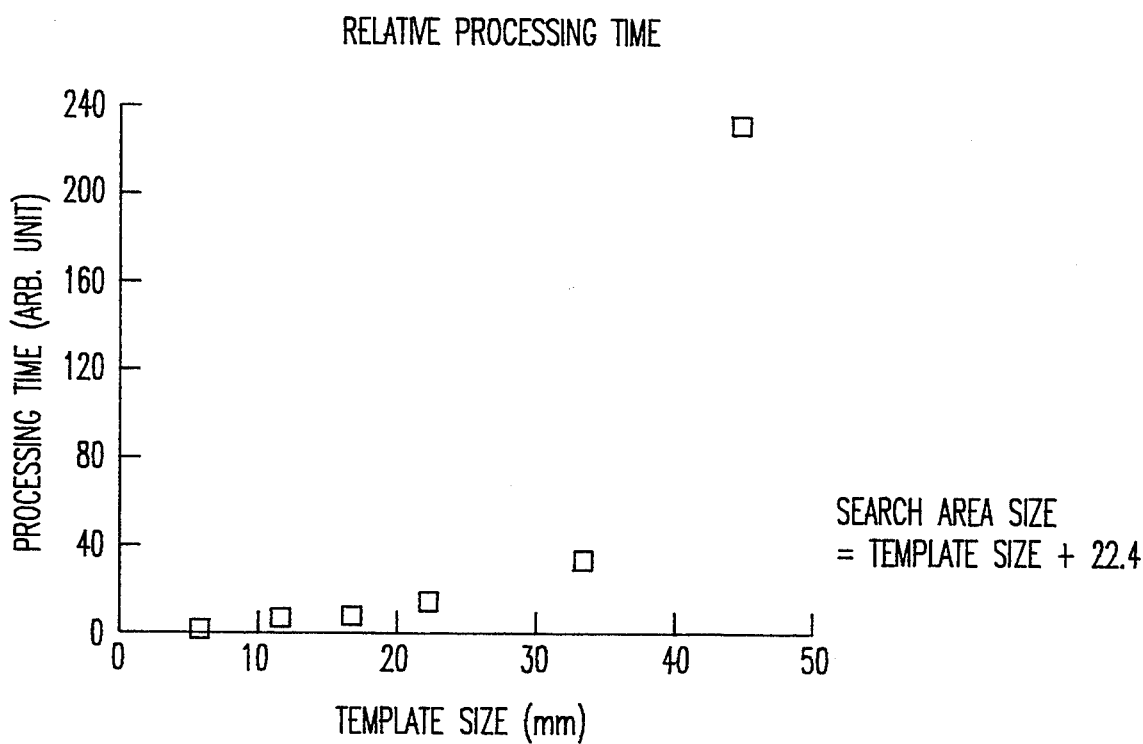

The size of template ROIs is preferably 5–50 mm in diameter, and more preferably, 15–40 mm in diameter. The size selected will also depend on the particular local matching algorithm used. As shown in FIG. 3, if the size of the templates ROIs is too small, the accuracy of matching will be low. On the other hand, if the size is too large, processing time will be long. Also, if the size is too large, the matching for the entire ROI may not be consistent with the matching for the center part of the ROI. In other words, if a single large ROI is used for each of the template and search area ROIs, the structure within the ROI can change because of the large area being analyzed. Therefore, when an attempt is made to match these two regions, it will be possible that some parts of two ROIs will overlap well, while other parts will not match. The size of the search area ROIs should be larger than the corresponding template ROIs, preferably 10–40 millimeters larger in diameter. The size of the search area ROIs also depends upon the size of the temporal changes to be detected. If the size of the search area ROIs is too small, the accuracy of matching will be low, while if the size is too large, the corresponding regions will be matched, but even real temporal changes in pathology, such as change in heart size, change in diaphragm, etc. will be diminished. The distance between the centers of the two regions should be preferably 5-30 millimeters. If this distance is too small, however, the processing time will be relatively long, while if the distance is too large the accuracy of warping may be low. As shown in FIG. 4, the shape of the template and search area ROIs can be any one of a number of variations.

It should be noted that the ROIs do not have to be located all over the ribcage area. For example, extremely low density area in the mediastinum region may have a lower number of ROIs than the lung area, since it is less important in diagnosis. It is possible to set the longer distance between centers in the mediastinum region, or not to select ROIs in the low density area in the center of the mediastinum region. The mediastinum is the white area shown near the center of the chest image due to the spine and related anatomical structures. The density of this area will accordingly be low and therefore not much information will be obtained from this region and fewer ROIs will be selected here.

Figure 5:
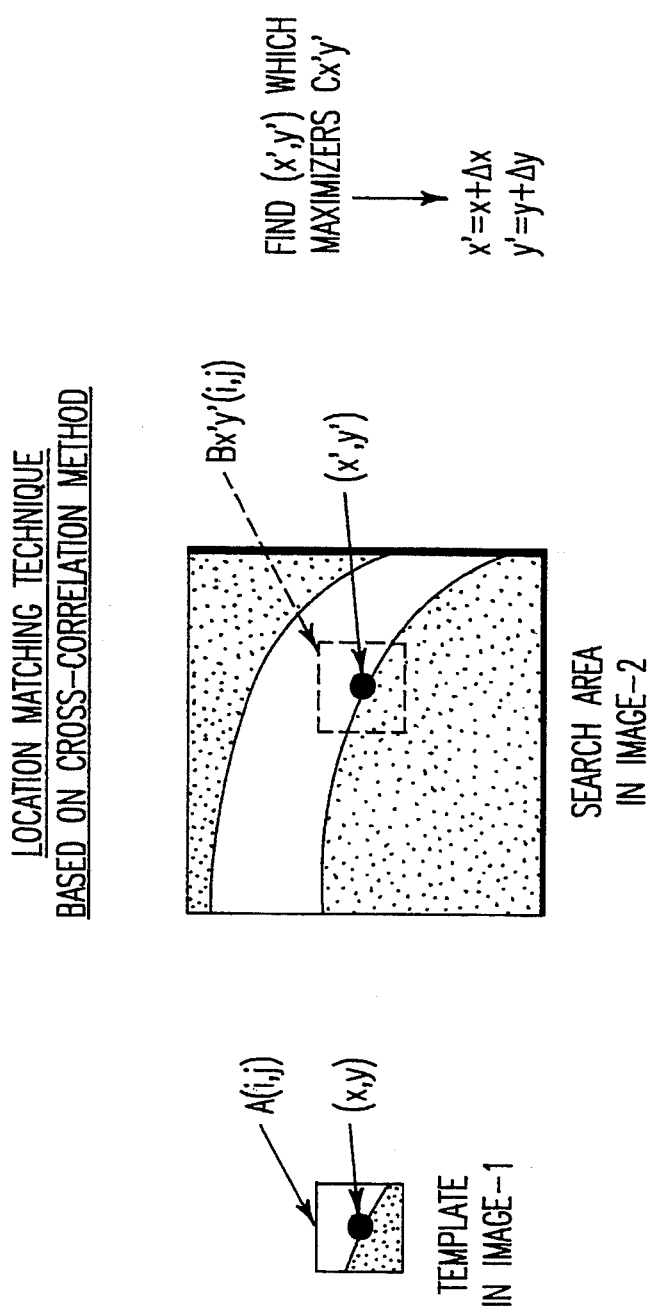
FIG. 5 illustrates a general principle of the local matching technique using a cross-correlation method.

The local matching technique of the invention is used to determine the subregion in a search area ROI which produces the "best" match with the corresponding template ROI. The "best" match means that the similarity between the image data in the determined subregion and those of the template is higher than any other possible subregions in the search area. Any existing algorithms to evaluate the similarities between two subimages and determine the "best" match can be used for local matching. The following equations and FIG. 5 illustrate the normalized cross-correlation method, where $$C_{x'y'} = \sum_{j=1}^{J} \sum_{i=1}^{I} \frac{\{A(i,j) - \bar{a}\} \{B_{x'y'}(i,j) - \bar{b}\}}{\sigma_a \cdot \sigma_b} \quad (1)$$

$$\bar{a} = \frac{1}{I \cdot J} \sum_{j=1}^{J} \sum_{i=1}^{I} A(i,j), \quad \sigma_a^2 = \sum_{j=1}^{J} \sum_{i=1}^{I} \{A(i,j) - \bar{a}\}^2$$

$$\bar{b} = \frac{1}{I \cdot J} \sum_{j=1}^{J} \sum_{i=1}^{I} B_{x'y'}(i,j), \quad \sigma_b^2 = \sum_{j=1}^{J} \sum_{i=1}^{I} \{B_{x'y'}(i,j) - \bar{b}\}^2$$

where C=1 if A and B are identical.

The above equations are used to find the subregion which maximizes the normalized cross-correlation value. General cross-correlation without normalization, as known from Hall, "Computer Image Processing and Recognition", Academic Press, 1979, also can be used, but normalization is preferable in order to reduce the effect of the difference in the average pixel values between two subimages.

A second manner by which the local matching technique can be performed according to the present invention is by using a least square difference method. With this method, that subregion which minimizes the summation of the squares of the difference values between the corresponding locations in the two images is determined, based on the following equation:

$$S_{x'y'} = \sum_{j=1}^{J} \sum_{i=1}^{I} \{A(i,j) - B_{x'y'}(i,j)\}^2 \quad (2)$$

This equation derives results which are identical to those obtained using the normalized cross-correlation method.

A third method for performing local matching between the locations of the two images according to the invention is by a least difference method. With this technique, the subregion which minimizes the summation of the absolute value of the difference between each pair of corresponding locations (pixels) in the two images is determined using the following equation:

$$D_{x'y'} = \sum_{j=1}^{J} \sum_{i=1}^{I} |A(i,j) - B_{x'y'}(i,j)| \quad (3)$$

A fourth method of local matching according to the invention uses a Fourier transform phase correlation technique, where the subregion which maximizes the correlation between the phase factors of Fourier transforms of two subimages is determined with the following equation:

$$P_{x'y'} = F^{-1}\left( \frac{F(u,v)}{|F(u,v)|} \cdot \frac{G_{x'y'}(u,v)}{|G_{x'y'}(u,v)|} \right) \quad (4)$$

where
F(u,v) is the Fourier transform of A(i,j)
G(u,v) is the Fourier transform of $B_{x'y'}(i,j)$
$F^{-1}\{\ \}$ is the inverse Fourier transform.

The normalized cross-correlation, least square difference and Fourier transform phase-correlation methods provide the best results in terms of accuracy of matching. Examples of the parameters which can be successfully used with the above local matching technique are as follows: a pixel size equal to 0.7 mm, a template ROI having a size equal to 22.4 mm×22.4 mm (32×32 matrix size), a search area size equal to 44.8 mm×44.8 mm (64×64 matrix size), distance between the centers equal to 7.0 mm (10 pixels), using a normalized cross-correlation method.

It should also be noted that calculations using a local matching algorithm do not have to be performed on a pixel by pixel basis, i.e., it is possible to skip pixels in both the template ROI and search area ROI in order to save processing time. Examples of the parameters which can be successfully used with the above local matching technique are as follows: a pixel size equal to 0.7 mm, a template ROI having a size equal to 22.4 mm×22.4 mm (32×32 matrix size), a search area size equal to 44.8 mm×44.8 mm (64×64 matrix size), distance between the centers equal to 7.0 mm (10 pixels), using a normalized cross-correlation method. Calculations were performed on a 16×16 matrix for each template, by skipping one out of every two pixels. The resulting registration was comparable to what was obtained without skipping pixels, and the processing time was reduced to one-fourth that without skipping pixels.

One of the above local matching techniques can be performed in two or more steps for each center of the template. For example, for the first step, a relatively large template ROI and a relatively large search area ROI can be selected, and then a coarse-search local matching method can be employed by skipping pixels to find an approximate location of center of the "best" match subregion. Next, a small template ROI and a small search area ROI near the approximate "best" match location are selected to perform a fine-search for local matching in the second step. This method can improve accuracy and also can save processing time, if proper processing parameters are selected.

Examples of the parameters used for the above method are as follows: a pixel size equal to 0.7 mm, a template ROI having the dimensions 44.8 mm×44.8 mm (64×64 matrix size) for the first step, and 11.2 mm×11.2 mm (16×16 matrix size) for the second step, a search area size equal to 67.2 mm×67.2 mm (96×96 matrix size) for the first step, and 19.6 mm×19.6 mm (28×28 matrix size) for the second step, a distance between the centers equal to 7.0 mm (10 pixels), and using a normalized cross-correlation method. For the first step, calculations were performed on a 16×16 matrix for each template, by skipping one out of every four pixels. The resulting registration was comparable to the results described above and the processing time was reduced to one-third that without skipping pixels.

By applying a local matching technique to the template ROI and the search area ROIs, the cartesian coordinate location of the center of the "best" match subregion can be found, which is indicated by (x′,y′) in the search area. The distance in the x and y directions between (x′,y′) and the location of the center of the template (x,y) is called shift value $\Delta x$ and $\Delta y$, respectively, as illustrated in FIG. 5. The distribution of those shift values over the important area of the chest image which is obtained from a number of pairs of template and search area is the critical information which is necessary in order to obtain the proper geometric warping of the (x,y) coordinates prior to subtraction of the images.

Figure 6A:
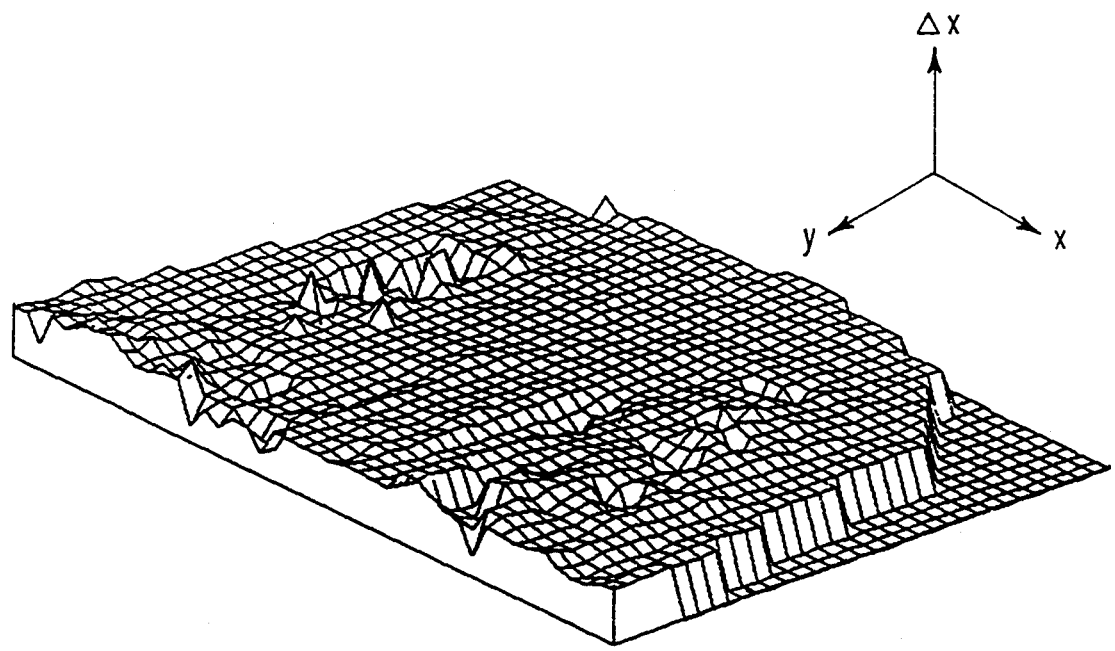
FIG. 6 shows schematic illustrations of the results of shift mapping between corresponding locations of the two images.
Figure 6B:
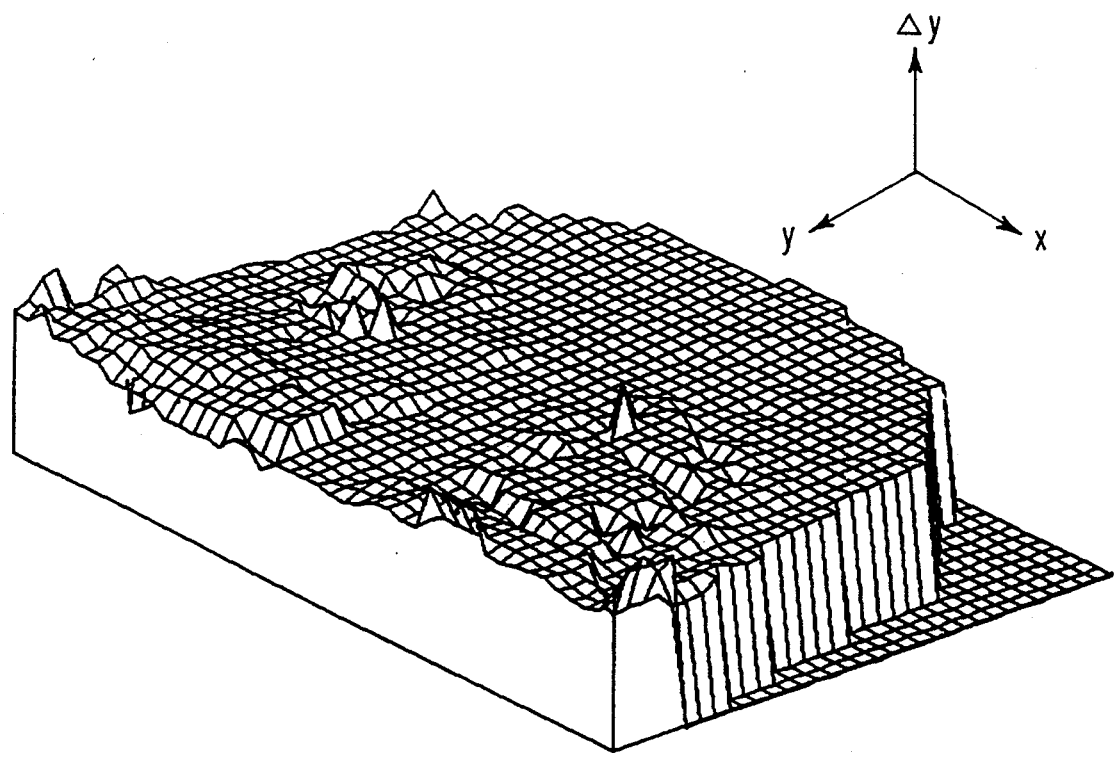

FIG. 6 shows examples of shift-maps showing the distribution of shift values $\Delta x$ and $\Delta y$, obtained by local matching using a normalized cross-correlation method. The pixel size used was 0.7 mm, the template shape was selected to be square with a size of 22.4×22.4 mm (32×32 matrix size), the search area size was selected to be 44.8×44.8 mm (64×64 matrix size), and the distance between the centers was selected as 7.0 mm (10 pixels).

In order to perform a proper warping of the (x,y) coordinates, it is necessary to interpolate, or fit, the above-mentioned shift maps to obtain the $\Delta x$ and $\Delta y$ values corresponding to each location (x,y) in the chest image. This can be done by interpolating the values of $\Delta x$ or $\Delta y$. Any existing interpolation method can be used for this purpose, such as nearest neighbor interpolation, linear interpolation, spline interpolation, etc. However, interpolation depends on all results including some templates with "poor" matching, and also those with real temporal changes, which cannot be matched in any way. In other words, if there is real temporal change, such as a tumor or development of other interstitial disease, there will be a real change in the chest images. In this case, the two images will not match perfectly because of the change in features of the two images. The reason for the local matching is to identify the "match" areas as much as possible and then to subtract them from each other. In some areas there will be poor matching because of low density regions in one or both images, additional artifacts, or the existence of real changes due to the development of disease. For example, FIG. 6 shows some singular points—unusually large or small shift values—in the distribution of $\Delta x$ and $\Delta y$, despite the relatively smooth surface in most regions. These singular points generally correspond to lesions with a temporal change, certain anatomic structure or devices in different locations, and/or an extremely low contrast region in the cardiac area. Shift values for these singular points are not reliable since it is impossible to find a "good" match for these templates. Therefore, if an interpolation method is used, interpolated shift values near those templates tend to produce improper shift values.

To avoid this effect, a curve fitting technique is applied to the shift values. Although any type of curve fitting method can be used, fitting with two-dimensional nth order polynomial functions (n$>=$2) is preferable for reasons of smoothness, as known from U.S. Pat. No. 4,851,984. The general form of a two-dimensional nth order polynomial is:

$$z(x,y) = a_1 + a_2 x + a_3 y + a_4 x^2 + a_5 xy + \quad (4)$$
$$a_6 y^2 + a_7 x^3 + a_8 x^2 y + a_9 xy^2 + a_{10} y^3 + \ldots$$
$$a_{\frac{n(n+1)}{2} + 1} x^n + a_{\frac{n(n+1)}{2} + 2} x^{n-1} y + \ldots +$$
$$a_{\frac{(n+1)(n+2)}{2} - 1} xy^{n-1} + a_{\frac{(n+1)(n+2)}{2}} y^n$$

$$z(x,y) = \sum_{k=1}^{n+1} \sum_{m=1}^{k} a_{\frac{(k-1)k}{2} + m} x^{k-m} y^{m-1} \quad (5)$$

The following equations can be used for performing curve fitting on the shift values:

$$\sum_{i,j} x_i^{k-m} y_j^{m-1} \left( z_{i,j} - \sum_{s=1}^{n+1} \sum_{t=1}^{s} a_{\frac{(s-1)s}{2} + t} \cdot x_i^{s-t} y_j^{t-1} \right) = 0 \quad (6)$$

$$\sum_{s=1}^{n+1} \sum_{t=1}^{s} a_{\frac{(s-1)s}{2} + t} \sum_{i,j} x_i^{s-t+k-m} y_j^{t+m-2} = \sum_{i,j} x_i^{k-m} y_j^{m-1} z_{i,j}$$

where
k=1, 2, ..., n+1
m=1, 2, ..., k

The use of higher order of polynomials having an order greater than three is preferable for accuracy purposes, since a proper warping of the x, y-coordinates involves a considerably complicated transformation as expected from the general nature of radiographic misregistration due to the causes illustrated in FIG. 12.

In order to obtain improved registration of the two images, weighted fittings using two-dimensional nth order polynomials are preferable. With such weighted fittings, each point in an image area is provided with a weighting factor ranging from 0 to 1, which defines the extent of contribution to the determination of the coefficients $a_i$(i=1, 2, ... ) in equations (6) and (7) above. It is preferable to use large weighting factors for shift values with good (reliable) matching, and small weighting factors to shift values with poor (unreliable) matching. Determination of the weighting factors can be performed based on an analysis of similarities of the two subimages using the local matching technique, as well as by image analysis of anatomic structures, and analysis of pixel value distribution, as described below.

Figure 7:
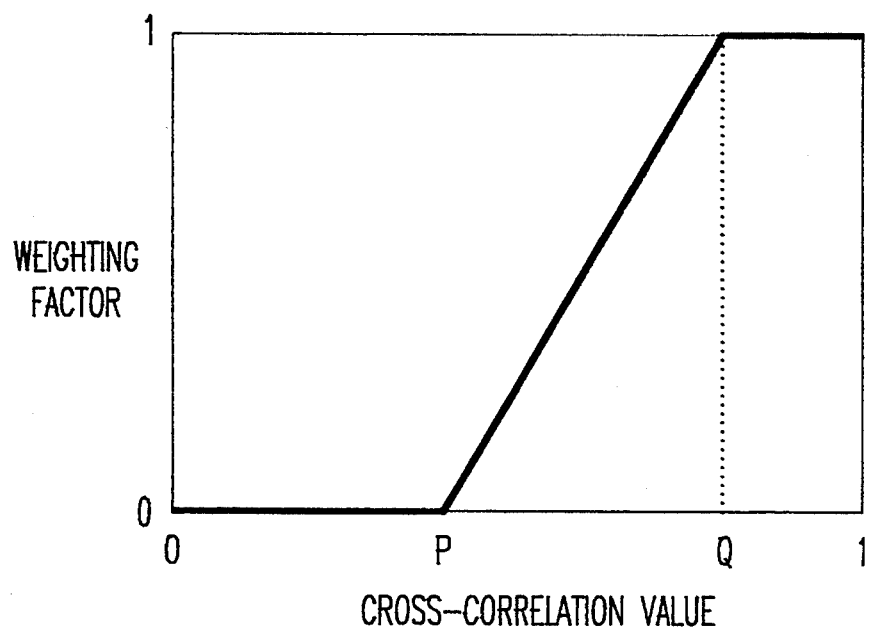
FIG. 7 illustrates the general principle of the weighted fitting of the shift mapping results.

A local matching method evaluates similarities between a template ROI and a subregion selected in a search area ROI in order to determine a "best" match subregion. Any local matching method has a measure for similarity, such as the normalized cross-correlation value in the cross-correlation method. In this case, the larger the normalized cross-correlation value, the better the matching which is produced for the template, as shown by equation (1) above. Therefore, the weighting factors can be determined based on the similarity measure produced by the "best" match subregion for each template, so that shift values with good matching having a large similarity measure are provided with large weighting factors. For example, if the cross-correlation method is used for local matching, a lookup table can be generated which defines the relationship between weighting factors and the normalized cross-correlation values. Weighting factors for all shift values in a shift-map can therefore be provided in accordance with the lookup table, as illustrated in FIG. 7. As examples of possible values of P and Q, P may typically have a value equal to 0.65 when Q has a value equal to 0.9.

Since the lung areas contain more important diagnostic information in comparison to other regions, large weighting factors can be provided for fitting of the shift values obtained with templates in the lung area. Location of lung areas can be determined by image analysis schemes such as disclosed in U.S. Pat. Nos. 4,851,984 and 5,072,384 for the detection of specific anatomic structures such as ribcage edges, diaphragm, heart area, and mediastinum. For example, the weighting factor is set to be "zero" under the diaphragm and in the middle of the mediastinum, and will be "one" in the rest of the region. Also, if this method is used for the detection of interval changes in specific regions in chest images, those specific regions can be provided with large weighting factors. For example, the density distribution of the various locations around the mediastinum, heart and diaphragm will frequently be very low and therefore little information will obtained from these regions. The contributions from these areas will accordingly be ignored, and the weighting factors of these regions set at 0. From a histogram analysis, the maximum and minimum pixel values for these regions will indicate their locations. About 10% of the low pixel values will therefore be ignored since these regions offer little, if any, diagnostic information to the radiologist, due to the low density of these regions. Also, the weighting factors are dependent on the locations of the anatomical features since outside the ribcage edges there is little diagnostic information and therefore the correlation, i.e., matching, outside these areas are also ignored.

Large weighting factors for fitting of the shift values obtained with templates can be provided in diagnostically important regions, by analyzing the distribution of pixel values. In general, lung areas have relatively large pixel values, while the mediastinum area has smaller pixel values, provided that the high density regions are converted to the large pixel value upon the digitization of the images. Therefore, it is preferable to provide small weighting factors for the shift values obtained with templates having extremely low average pixel values, which correspond to the center of the mediastinum area. A lookup table can be generated which defines the relationship between weighting factors and the pixel values, in order to determine weighting factors for different locations in the chest images. For example, the weighting factor is set at zero between the minimum pixel value and the value {minimum+0.1×(maximum - minimum)}, and is 1 for all larger pixel values. Weighting factors can be determined based on a combination of these three types of analysis.

Figure 8A:
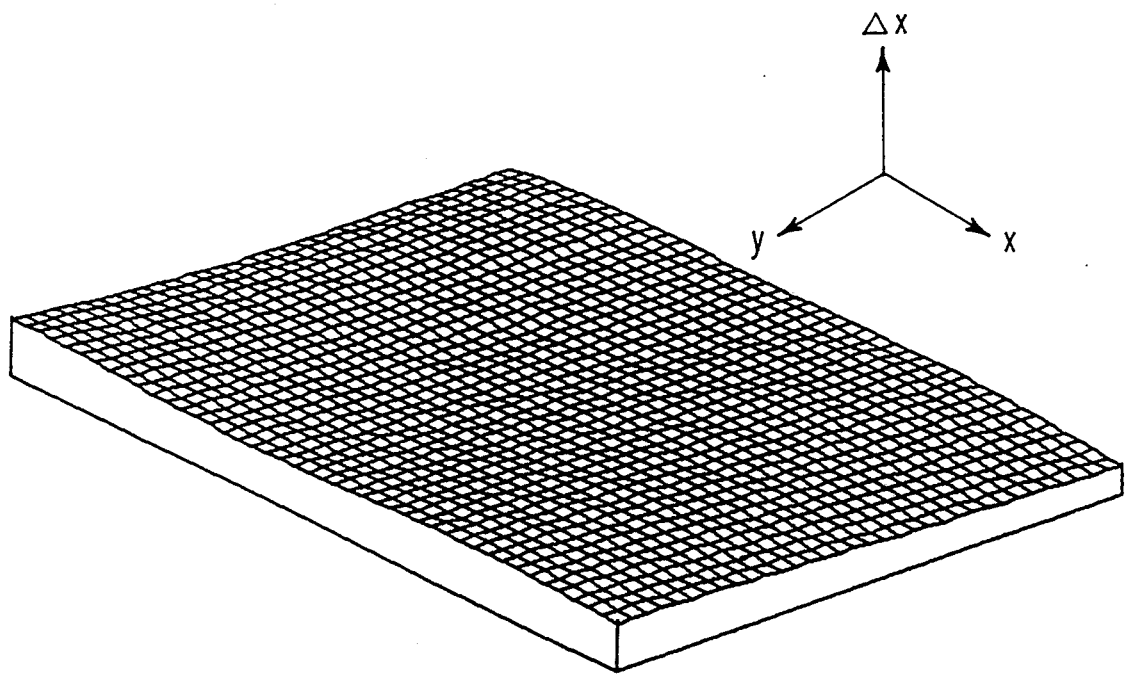
FIG. 8 illustrates shift-maps of the distribution of fitted shift values $\Delta x$ and $\Delta y$, generated from the shift-maps shown in FIG. 6 using two-dimensional nth-order polynomials.
Figure 8B:
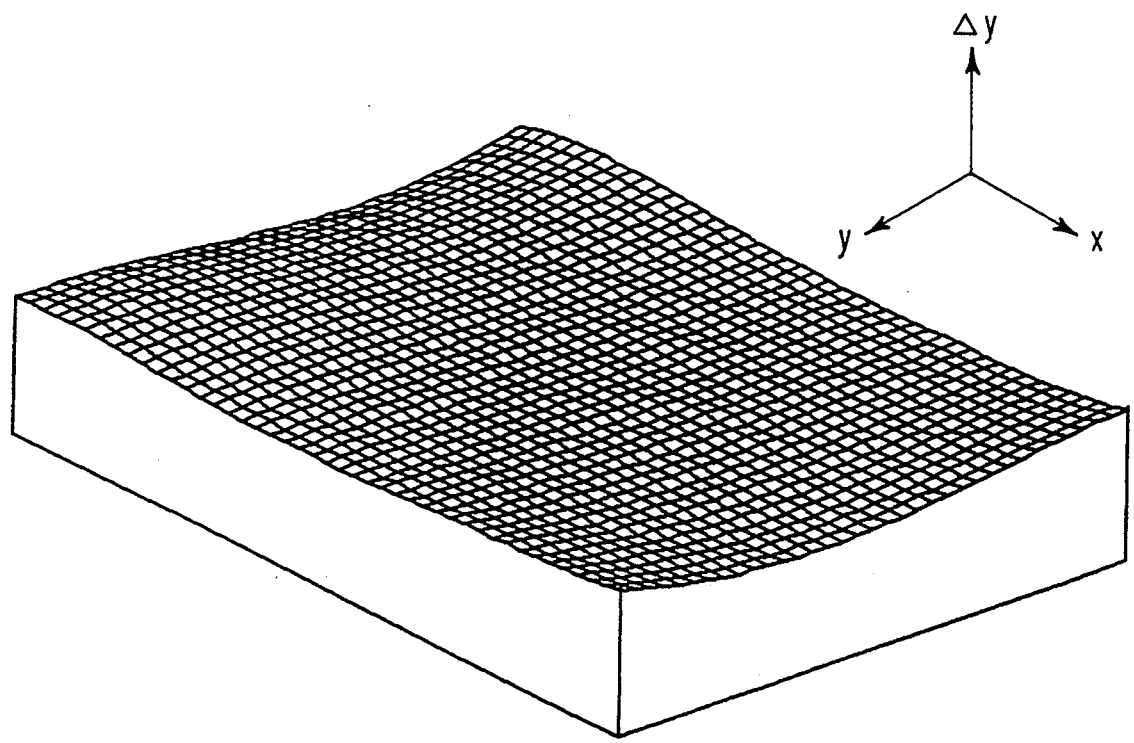

FIG. 8 shows shift-maps illustrating the distribution of fitted shift values $\Delta x$ and $\Delta y$, generated from the shift-maps shown in FIG. 6. A weighted fitting was performed using two-dimensional 10th order polynomials with weighting factors determined by using the lookup table shown in FIG. 7 with P=0.65, Q=0.95. The shift values for the points outside the ribcage were determined by a linear extrapolation method.

After the shift values $\Delta x$ and $\Delta y$ are obtained as functions of the locations of the pixel, (x,y), the nonlinear transformation of the (x,y) coordinates can be determined. The obtained pairs of $(\Delta x, \Delta y)$ refers to the fact that a point (x,y) in one image corresponds to the point $(x+\Delta x, y+\Delta y)$ in the other image, as shown in FIGS. 9 and 10.

Figures 9A, 9B:
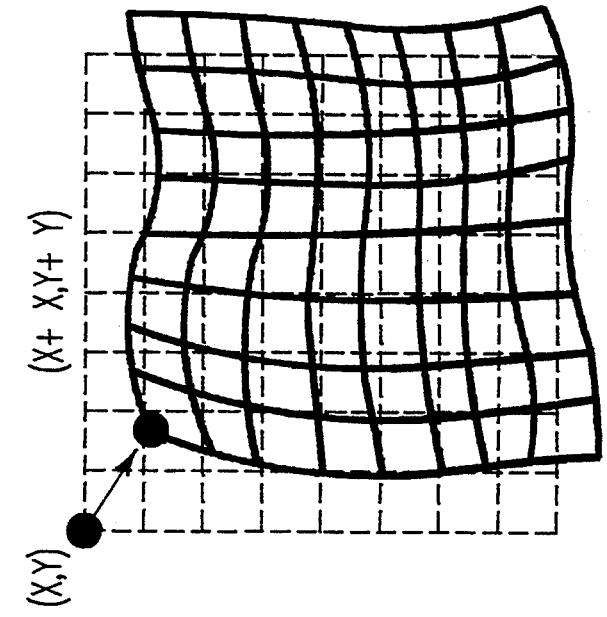
FIG. 9 shows the concept of nonlinear warping of the x,y coordinates in accordance with the technique of the present invention.
Figure 10:
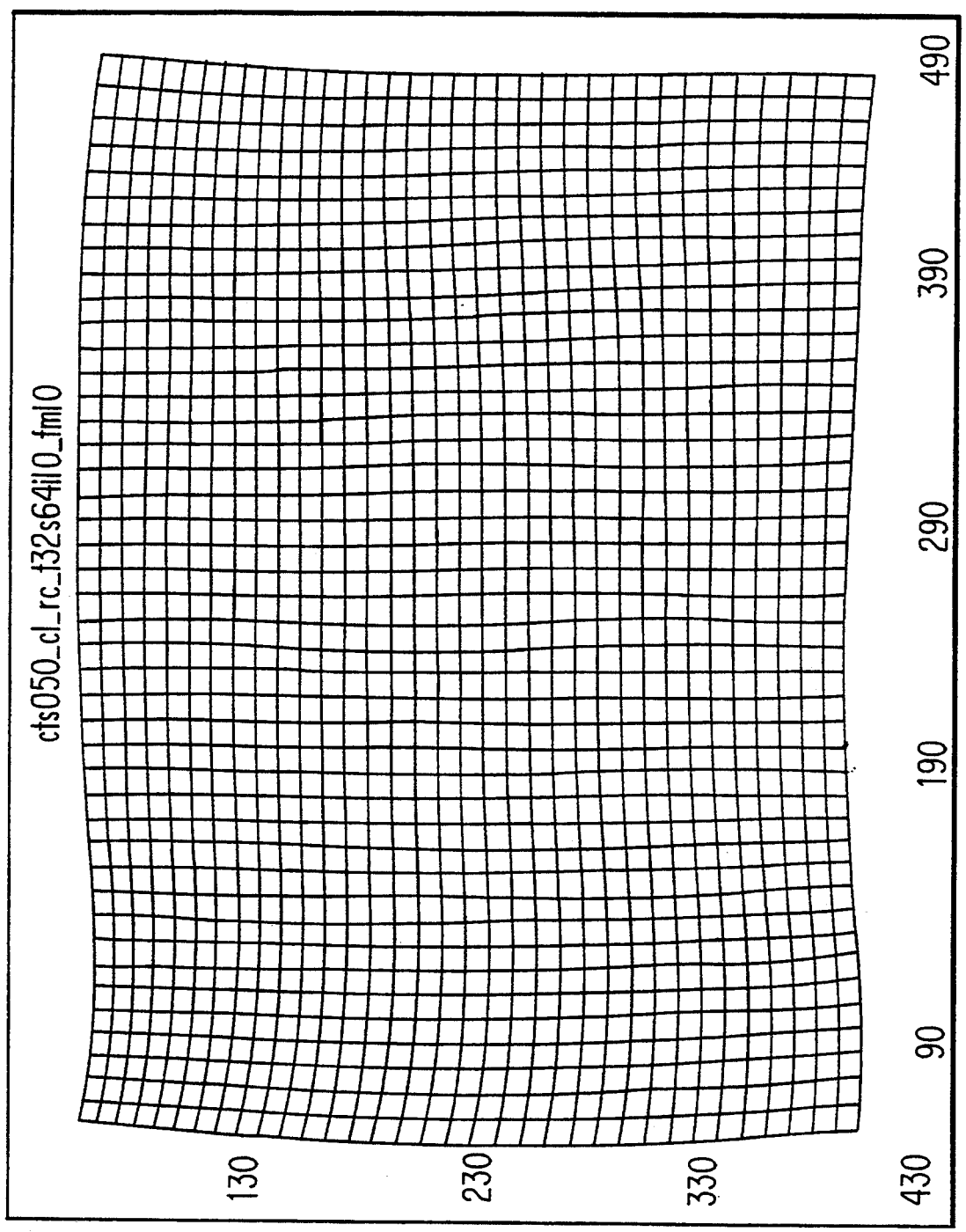
FIG. 10 illustrates a computerized printout of the grid pattern corresponding to the image to be warped such as shown in FIG. 9.

FIG. 9 shows an illustration of nonlinear warping according to the present invention. The dotted grid pattern on the left indicates the cartesian coordinates (x,y) in one image and the solid grid pattern overlapping the dotted grid pattern indicates the corresponding points $(x+\Delta x, y+\Delta y)$ in the other image. The solid grid pattern on the left should be transformed to the solid grid pattern shown on the right in order to obtain proper registration. The equations below show the general form of this nonlinear transformation.

$$x + \Delta x = x' = \sum_{i=0}^{n} \sum_{j=0}^{n-i} a_{ij} \cdot x^i y^j$$

$$y + \Delta y = y' = \sum_{i=0}^{n} \sum_{j=0}^{n-i} b_{ij} \cdot x^i y^j$$

FIG. 10 shows an example of the grid pattern of $(x+\Delta x, y+\Delta y)$ produced by the sets of shift values $\Delta x$ and $\Delta y$ in FIG. 8.

It should be noted that the coefficients $a_{ij}$ and $b_{ij}$ in the above equations do not have to be determined, since a subtraction image can be created by subtracting the pixel value of the point (x,y) in one image from the pixel value of the corresponding point $(x+\Delta x, y+\Delta y)$ in the other image using calculated values of $\Delta x$ and $\Delta y$, and then providing the subtraction value as the pixel value of a point (x,y) in the subtraction image. Since fitted shift values $\Delta x$ and $\Delta y$ are real numbers, the point $(x+\Delta x, y+\Delta y)$ can be located between pixels in a digital image. In that case, the pixel value can be substituted with an interpolated pixel value by using the adjacent pixels. Any existing interpolation methods can be used for this purpose, such as nearest neighbor interpolation, linear interpolation, spline interpolation, etc.

Figure 11A:
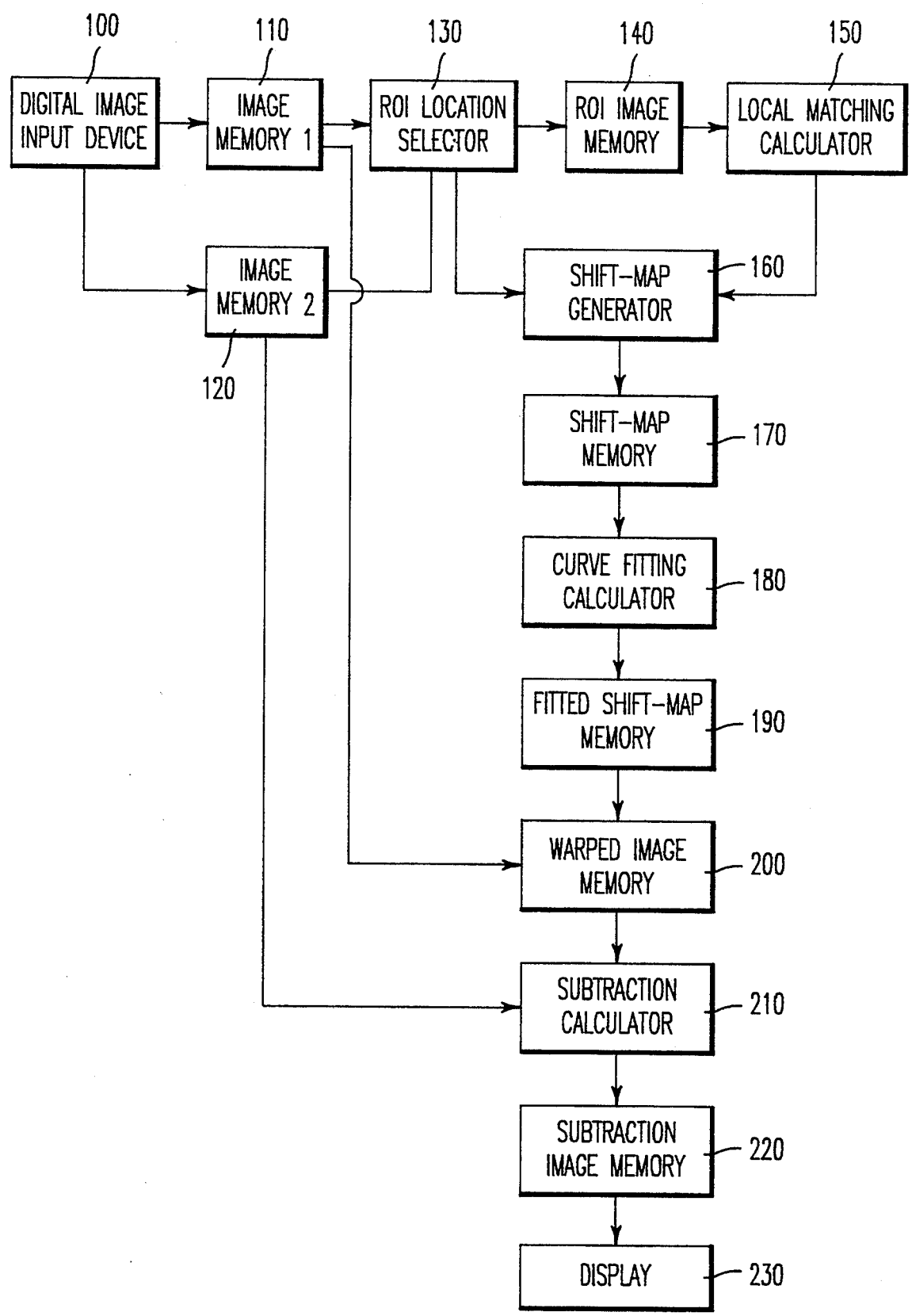
FIG. 11A illustrates the overall system used to implement the technique of the present invention.

The overall system according to the present invention, is shown in FIG. 11A. As shown, digital image input device 100 supplies the same digitized image to each of image memories 110, 120. Each of these memories has a first output which is received by ROI location selector 130. Image memory 110 has a second output which is received by warped image memory 200. Image memory 120 has a second output which is received by subtraction calculator 210. The ROI location selector outputs the result of the selection of the ROI locations to ROI image memory 140 and shift-map generator 160. Local matching is performed in calculator 150 which then outputs the result of local matching to the generator 160. Shift-map generator 160 outputs a result of the shift-map calculation to shift-map memory 170, wherein the mapping of values between the two images is stored. A curve fitting calculator 180 receives the output of memory 170 and performs the curve fitting function described above. This result is stored in memory 190 which then outputs to memory 200. The warped image stored in memory 200 is then received by the subtraction calculator device 210 for performing the subtraction process. The result of this process is stored in memory 220 and subsequently displayed to an output display device 230 for viewing by the radiologist.

Figure 11B:
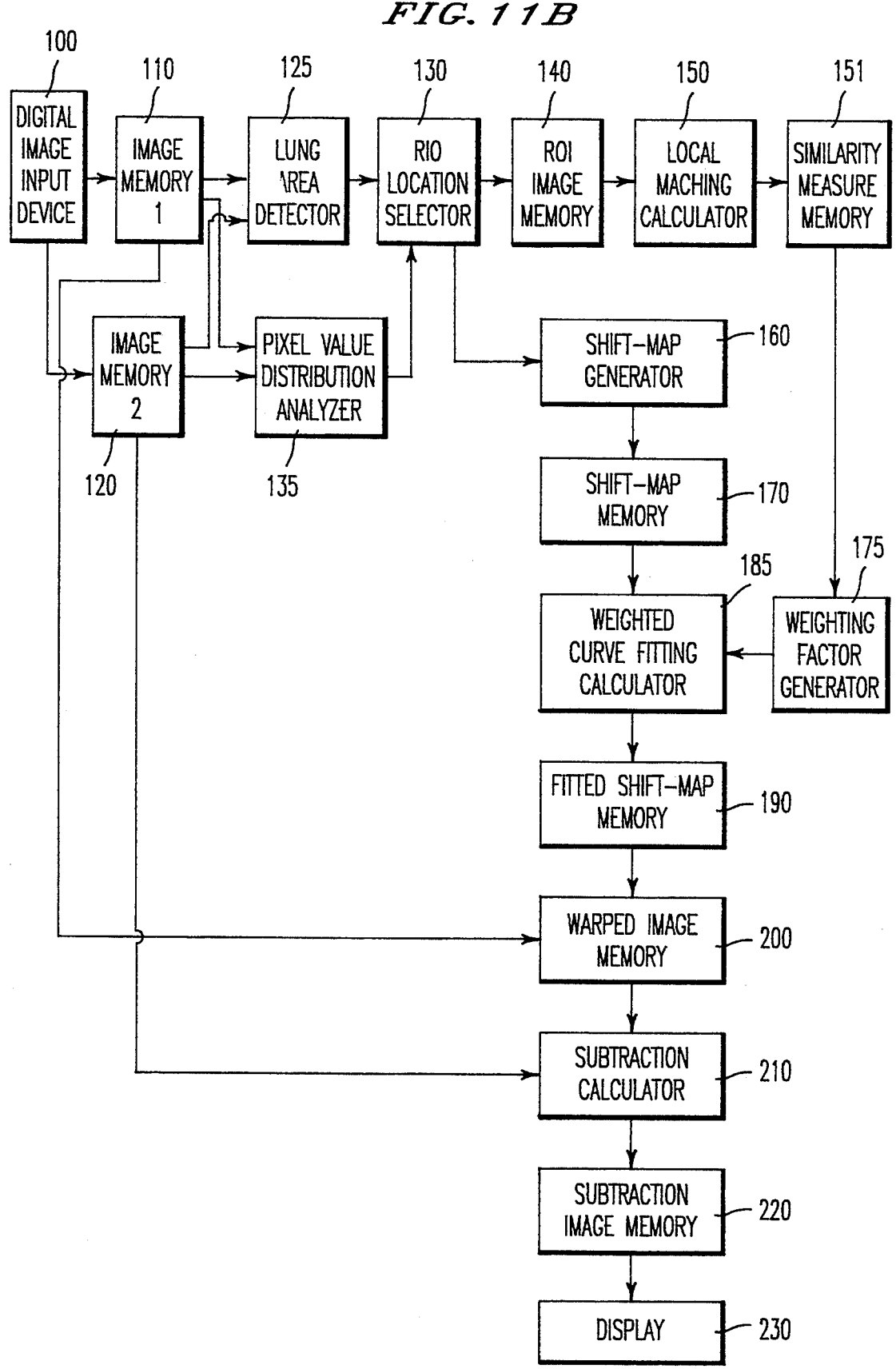
FIG. 11B illustrates the use of weighting factors with the curve fitting calculator in the system of the invention.

FIG. 11b shows the overall system according to the invention with the use of weighted factors for use in performing the curve fitting technique. As shown in this figure, a pixel value distribution analyzer 135 is connected in series between the memories 110, 120 and the ROI location selector 130. Also, a lung area detector 125 is serially connected between each of the memories 110, 120 and the selector 130. An additional memory 155 is provided for storing the results of the local matching calculations performed in calculator 150. These results are then output to weighting factors generator 175, for generation of the appropriate weighting factors to be applied to the selected ROIs. As shown, these weighting factors are output to weighted curve fitting calculator 185 wherein the above described process of performing any order polynomial fitting can be performed. The remaining elements of FIG. 11B are identical to those shown in FIG. 11A and therefore will not be described.

Figure 13A:
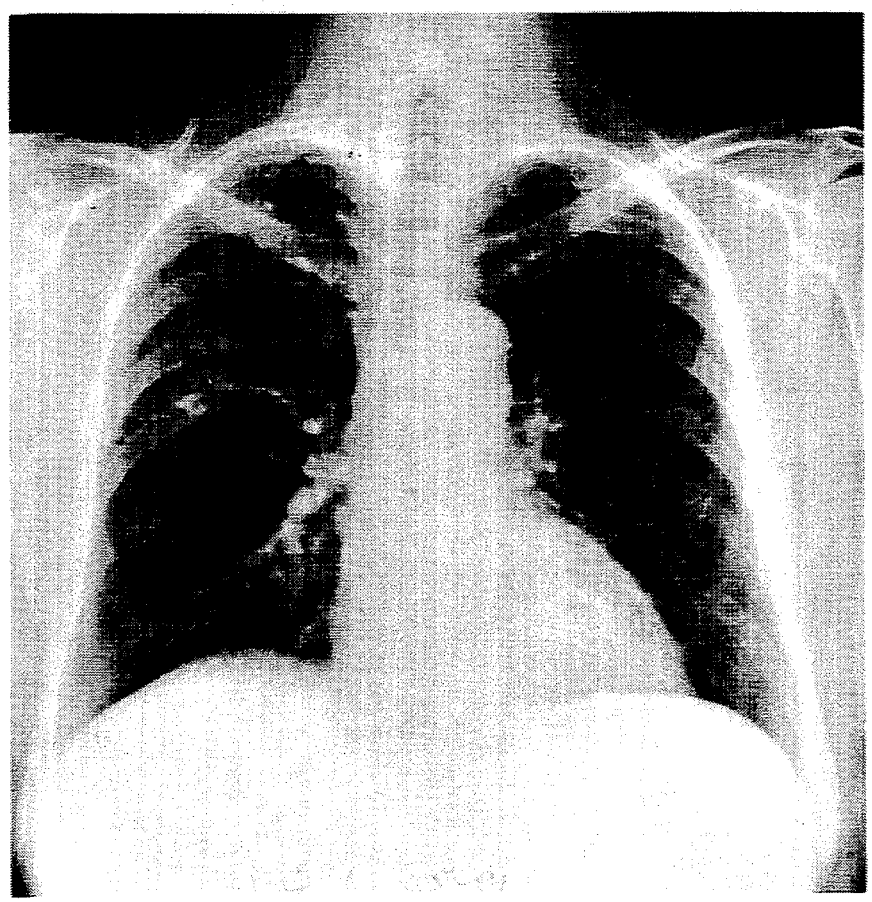
FIG. 13A illustrates a chest radiograph image having a focal air space infiltrate shown in the patient's right upper lobe.
Figure 13B:
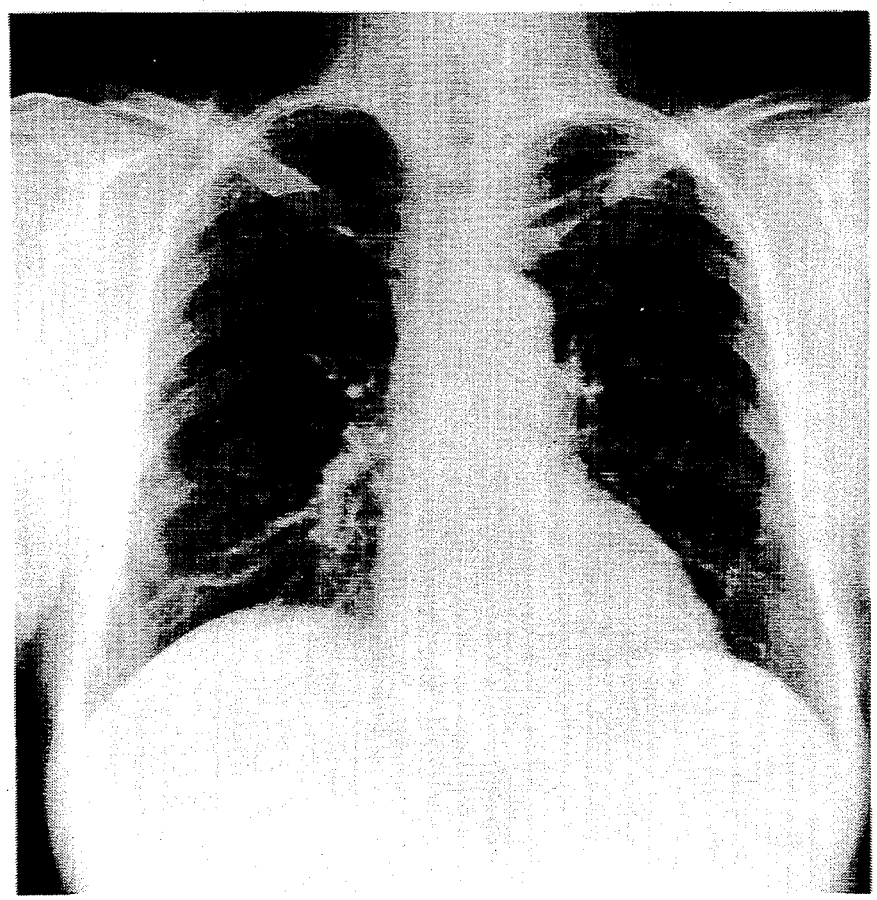
FIG. 13B illustrates a chest radiograph image corresponding to that shown in FIG. 13A taken three months earlier, without the appearance of the air space infiltrate.
Figure 13C:
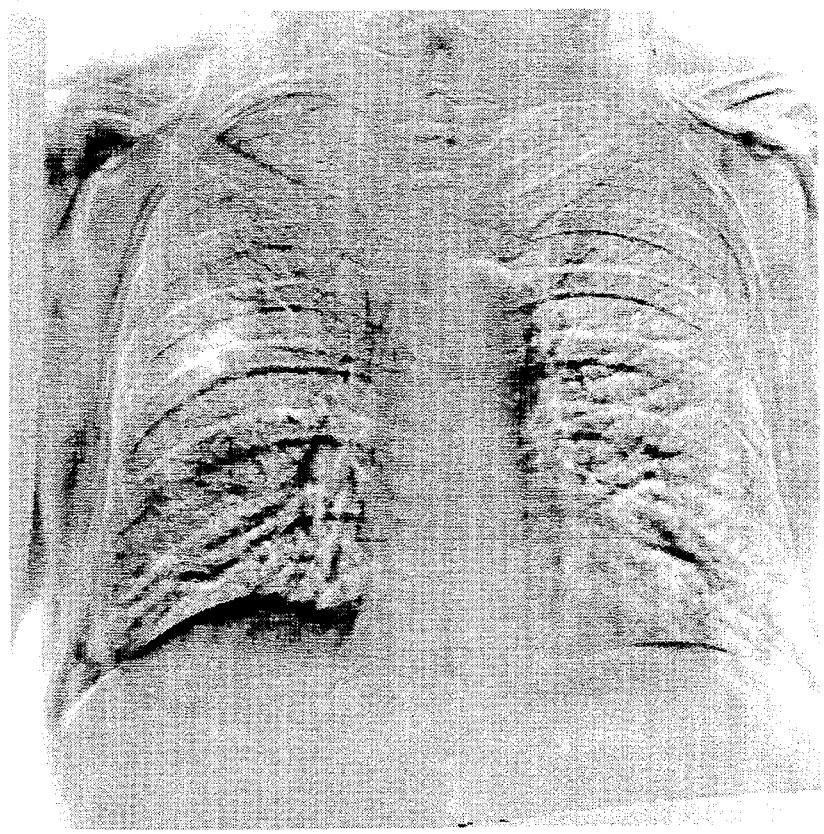
FIG. 13C represents the difference image obtained by subtraction processing between the images of FIGS. 13A and 13B.
Figure 14A:
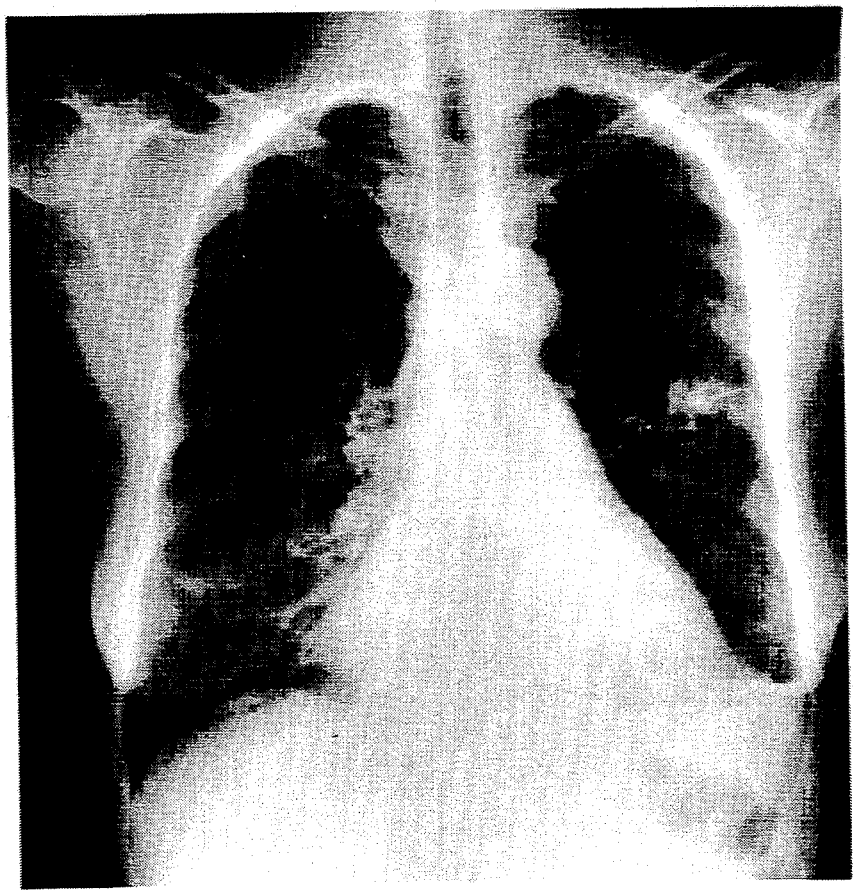
FIG. 14A shows a radiographic image of a patient's chest X-ray.
Figure 14B:
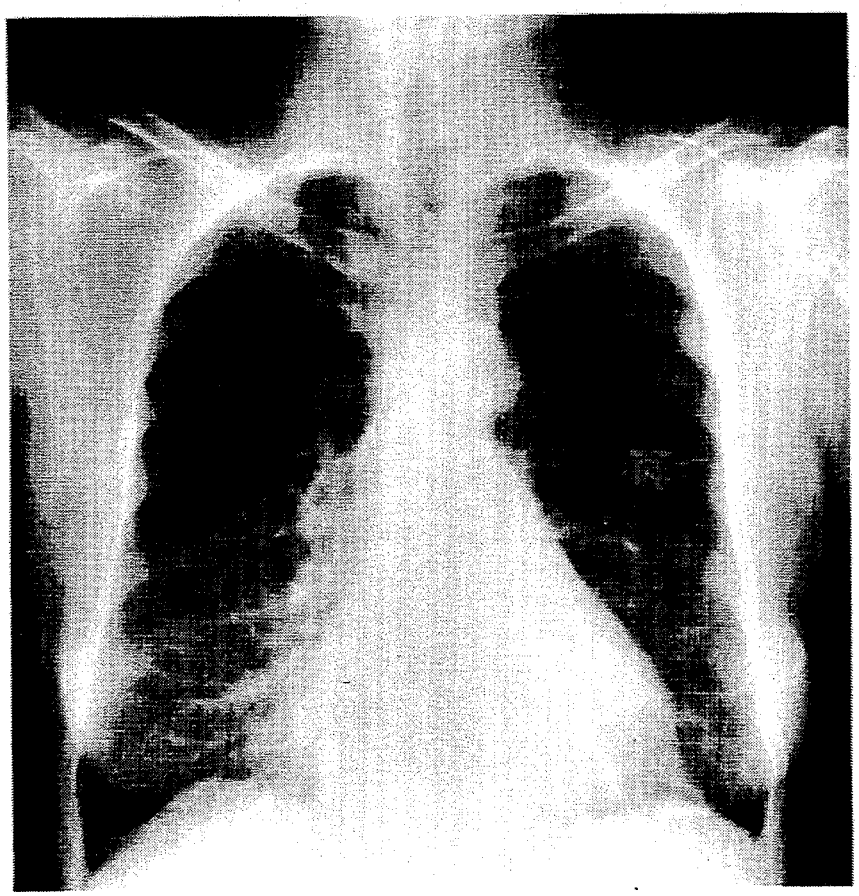
FIG. 14B shows a second image of the lungs of the same patient shown in FIG. 14A.
Figure 14C:
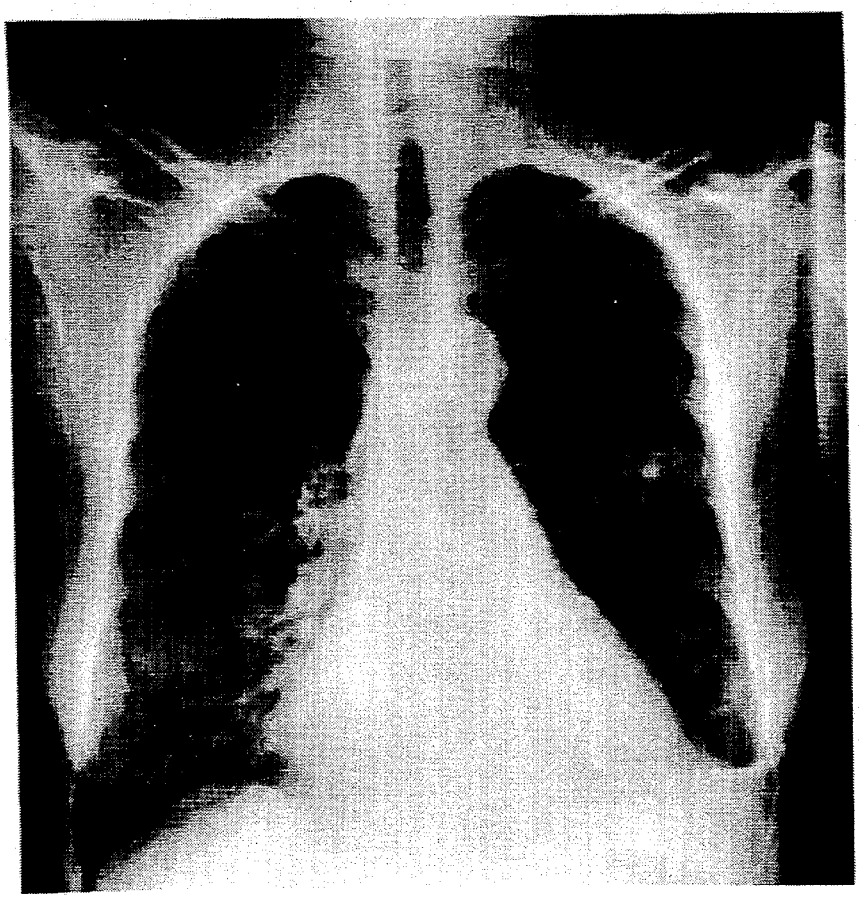
FIG. 14C shows the warped image of a FIG. 14A.
Figure 14D:
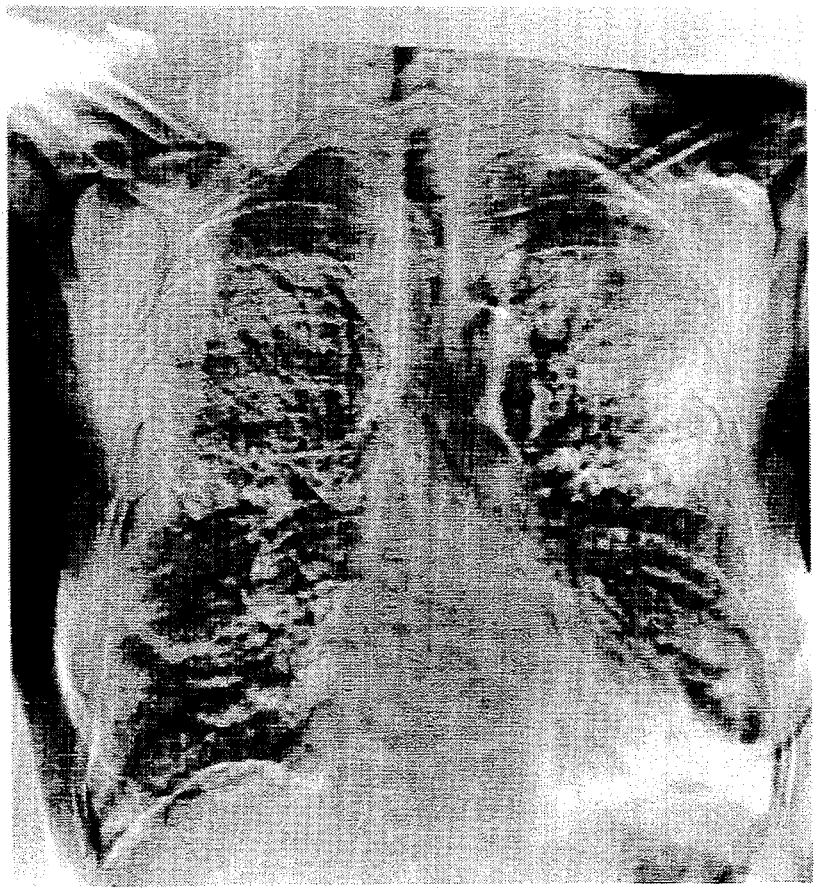
FIG. 14D shows the difference image produced between the warped image of FIG. 14C and the second image shown in FIG. 14B.
Figure 15A:
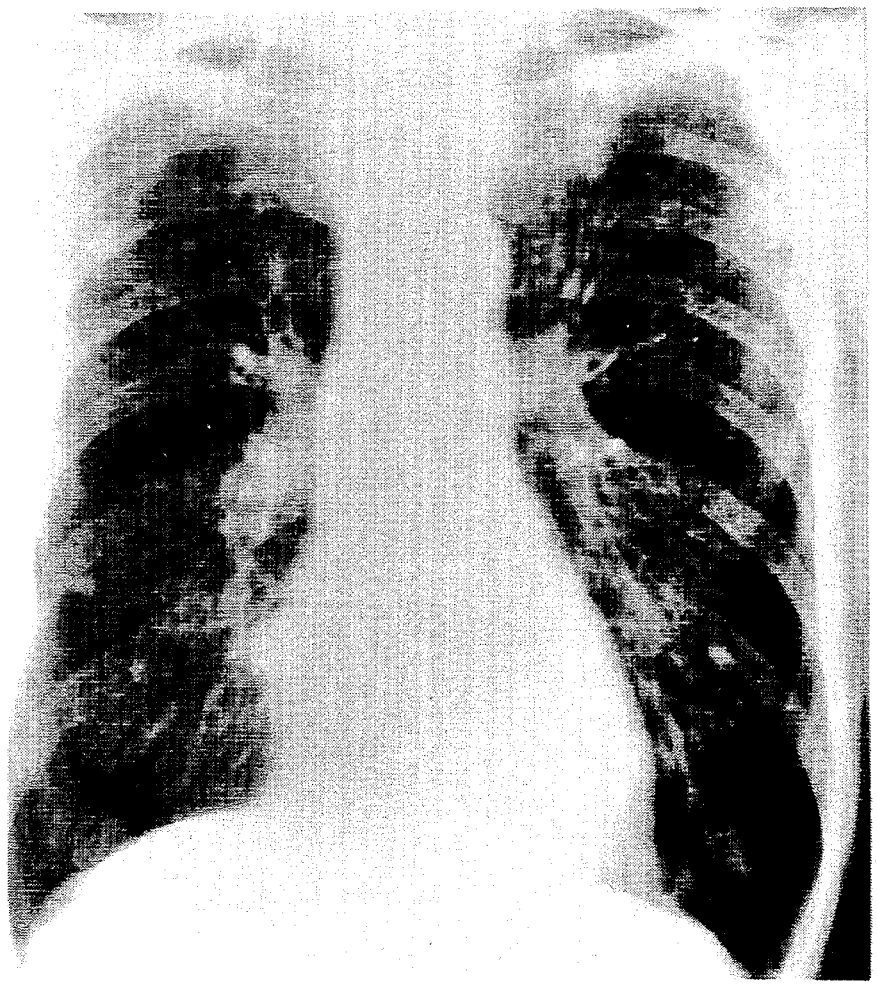
FIG. 15A shows a chest radiograph image having multiple nodules, one of which in the left upper lobe has developed a cavity therein, as shown by the light regions representative of opacities within the lungs.
Figure 15B:
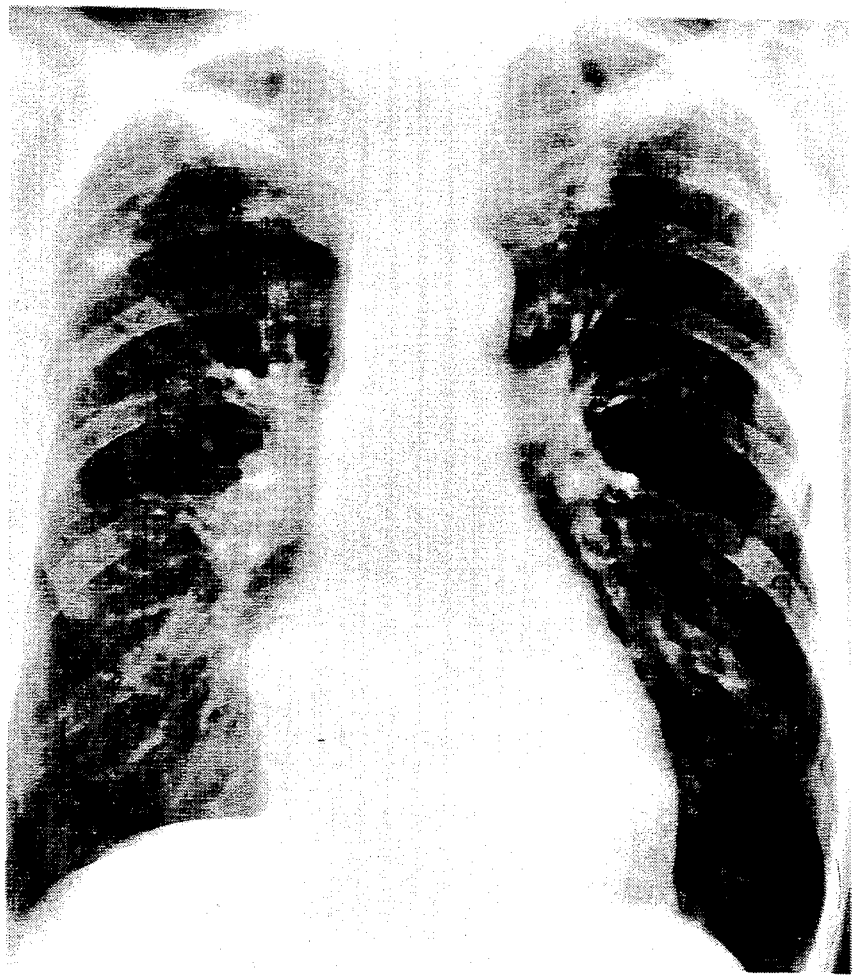
FIG. 15B shows the image of FIG. 15A taken two years earlier and showing the existence of multiple nodules less prominent than those shown in FIG. 15A.
Figure 15C:
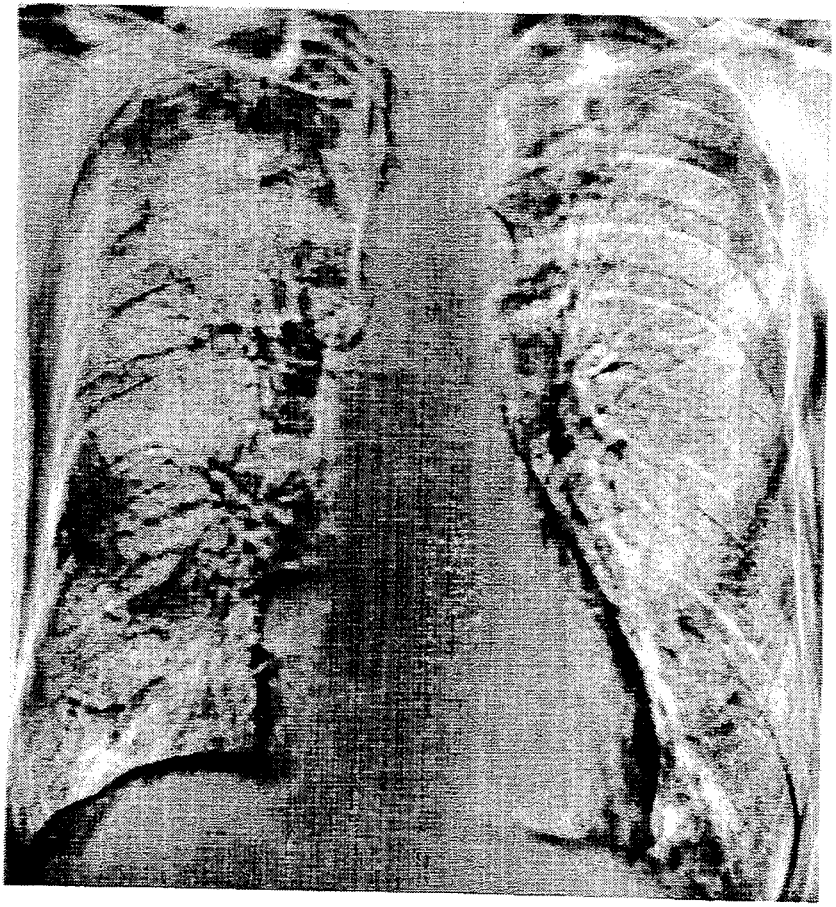
FIG. 15C illustrates a difference image produced between the images of FIGS. 15A and 15B.
Figure 16A:
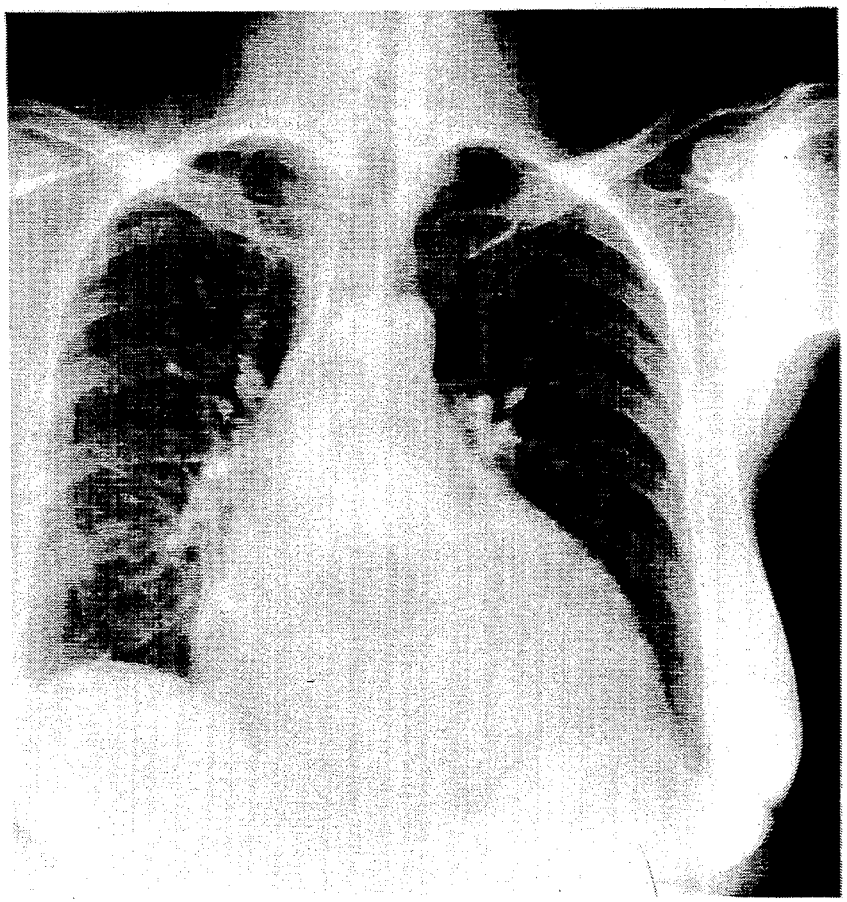
FIG. 16A illustrates the existence of a cardiomegaly.
Figure 16B:
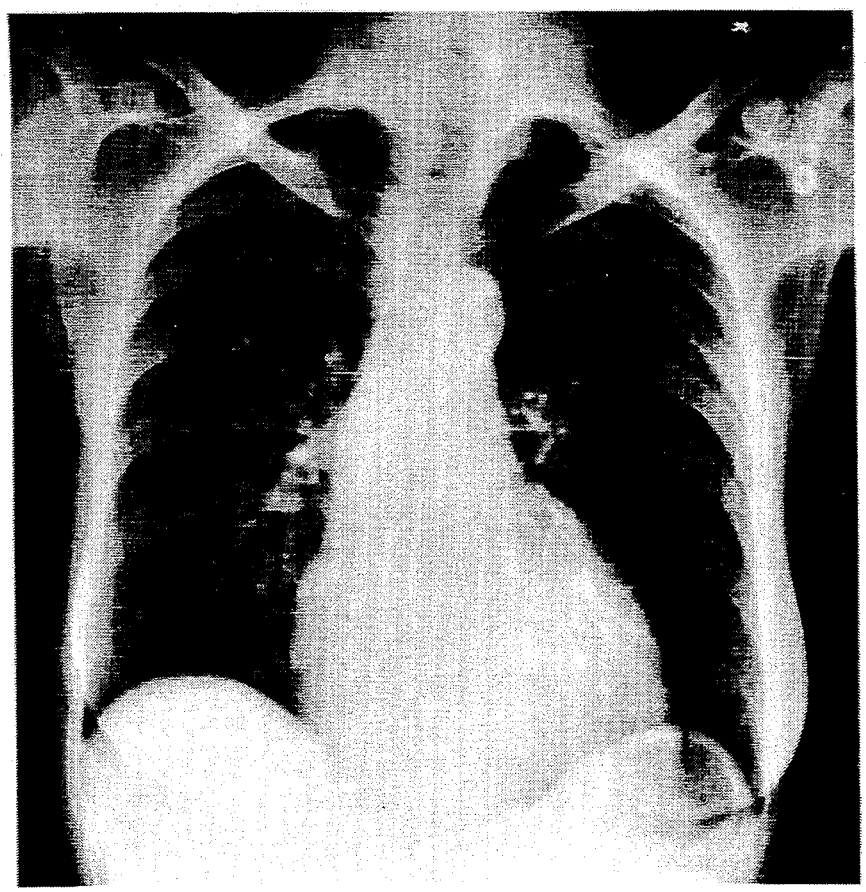
FIG. 16B illustrates a chest radiograph image of the same patient's lungs with a cardiomegaly as shown in FIG. 16A and taken two years earlier.
Figure 16C:
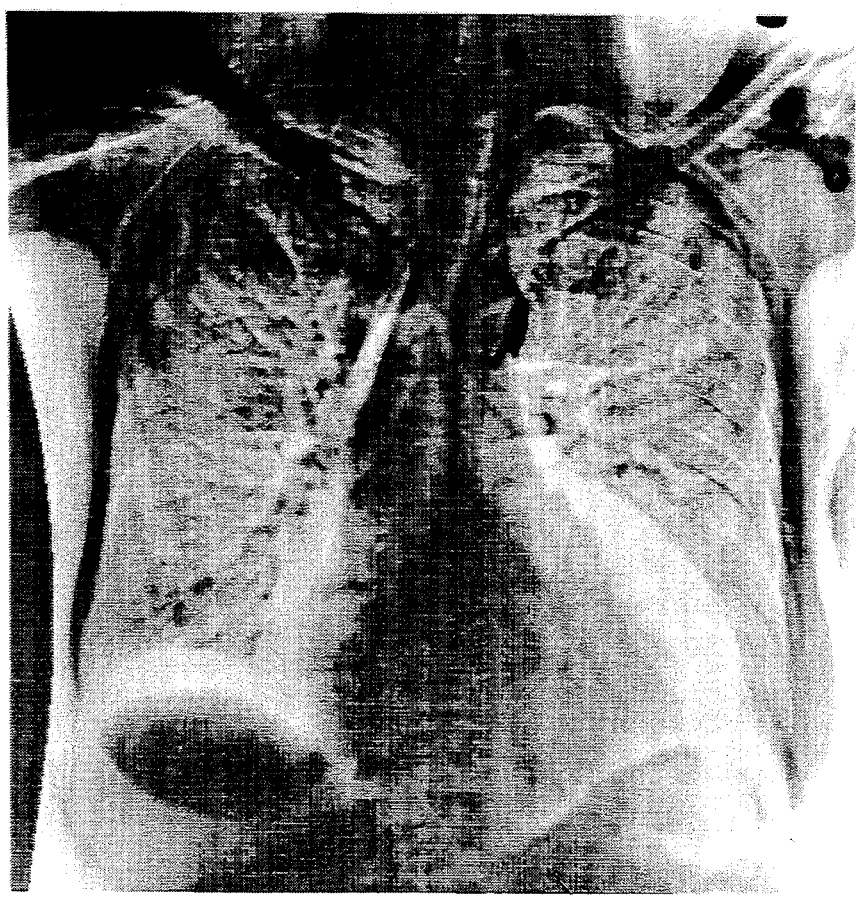
FIG. 16C illustrates a difference image obtained by the subtraction of images 16A and 16B using the technique in accordance with the present invention.
Figure 17:
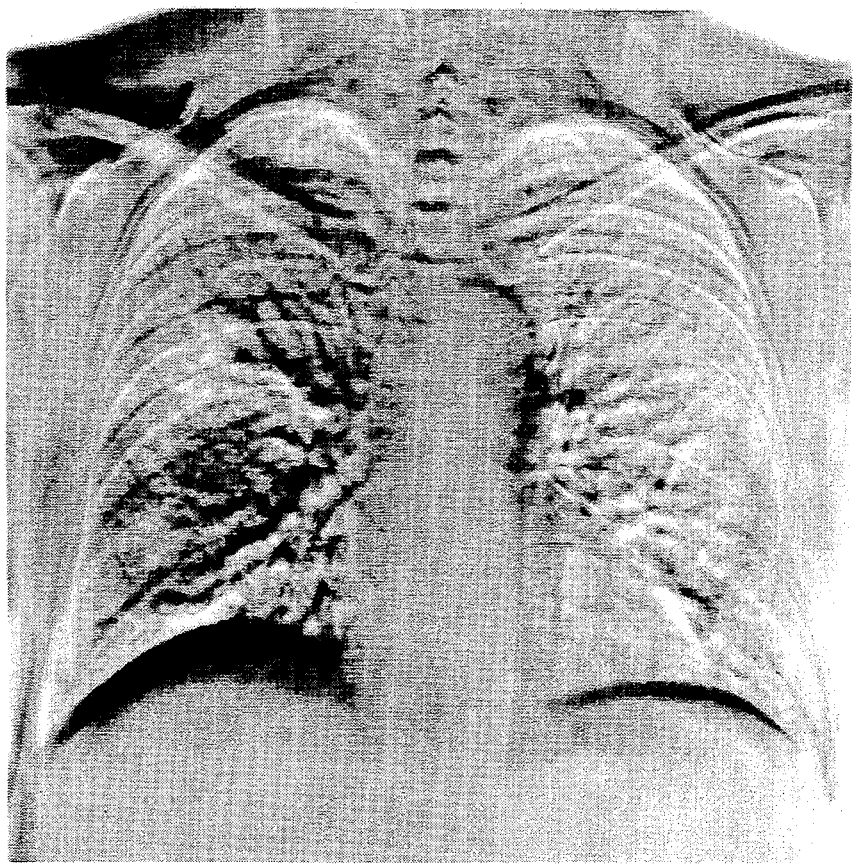
FIG. 17 illustrates the effects caused by various artifacts in the subtraction image employing global shift registration without the use of the present invention, where the effects are quite prominent due to a mismatch of bones and vessels.

The results of the inventive scheme are illustrated in FIGS. 13A–17. As shown in FIGS. 13A and 13B an air space infiltrate which was not present in the image of FIG. 13B, the image two years later showed the existence of the infiltrate quite clearly. With the inventive technique, the two images were registered and digitally subtracted, thus providing the enhancement of the infiltrate in the patient's right lung. FIGS. 14A–D illustrate an example of warped and unwarped images and a substraction image formed between the two images (lower right). FIGS. 15A and 15B illustrate a pair of images for a particular patient where the earlier image, FIG. 15B, was taken two years earlier than that of FIG. 15A. The difference image (subtraction) is shown in FIG. 15C. This figure shows that only the upper left lung nodule which had enlarged between the two images was enhanced using the differencing technique. FIG. 16A shows the existence of cardiomegaly, i.e., enlargement of the heart, and the same image taken two years earlier, FIG. 16B. The subtraction image clearly shows in FIG. 16C the difference in amount of cardiomegaly and also the accompanying profusions (as indicated below the image) which resulted from the cardiac failure associated with the enlargement. FIG. 17 shows a difference image which was produced with the global shift of one of the pair of images. The existence of various artifacts in this figure is prominent due to the mismatch of the anatomical features.

FIGS. 14A–14D show an example of the digital image subtraction processing used in this invention, using two temporally sequential original images where one of the original images is warped using the image registration processing method described above. Also illustrated is a resulting subtraction image. With the example of FIGS. 14A–14D, nearest neighbor interpolation was used.

Preprocessing Techniques

Preprocessing can be performed prior to the selection of ROIs or prior to the performance of local matching, in order to improve the registration and/or subtraction process. Examples of such preprocessing techniques are nonlinear density correction, as disclosed in copending U.S. application Ser. No. 07/786,008, matrix size reduction, contrast enhancement, and/or edge blurring. It is preferable to perform nonlinear density correction as preprocessing since it provides uniform density in regions without interval change in subtraction images, and is useful in enhancing regions with interval changes.

Post-Processing Techniques

Post-processing can be performed after the subtraction of the two images in order to more effectively visualize interval changes, or to extract quantitative information about detected interval changes. Examples include windowing, edge enhancement or blurring, and/or thresholding. Also, existing computer-aided diagnosis (CAD) schemes for the detection of abnormalities in chest images, as described in U.S. Pat. Nos. 4,907,156; 4,839,807; 5,072,384 and copending U.S. application Ser. Nos. 07/617,080 and 07/843,715, for example, can also be applied as post-processing of the subtraction images.

Output of the Subtracted Images

The subtraction images can be viewed by the radiologist as a final data output. It is preferable that they be displayed along with the original images for comparison purposes of the original images with the subtraction images. The subtraction images can be displayed either as softcopy such as video displays, or as hardcopy such as printouts with a laser film printer or a thermal printer. It is also desirable to display the images after proper contrast enhancement processing, such as windowing, for example. Other types of image processing also can be performed prior to display, such as filtering or magnification, in order to improve image quality.

Also, it is possible to detect interval changes by using the subtraction images, which can thus provide information to radiologists about the locations of those possible changes. In order to detect possible interval changes, various image analysis and processing schemes can be used, such as thresholding, filtering, histogram analysis, and other image analysis techniques used in existing CAD schemes. The locations of the detected possible interval changes can be indicated using notations such as arrows superimposed on the subtraction image or the original image(s), as an independent figure or as numerical data. Other characteristics of the detected possible interval changes other than their locations can also be output, such as size, shape, or other significant features about the interval changes. It is also possible to generate information concerning possible interval changes along with the original pairs of images, as an alternative to providing the subtraction images.

In the subtraction technique using automated image registration, experiments have shown that both the average cross-correlation value and the processing time increase as the template size increases. Template sizes smaller than 24×24 did not show desirable results since they produced a large amount of error data in shift values. Large template sizes such as 48×48 and 64×64 showed generally good registration in the resulting images. However, mismatch of the fine structures in certain regions occurs because the best match for a large template is not always a proper representative of the best match at the center. A template size of 32×32 provides adequate results. The effect of a non-linear density correction technique was also examined using original images with an exposure level x1.41 and x0.84. It was found that (a) the density correction improves the rib cage detection only for images with an exposure level lower than x0.5, (b) the density correction does not affect local matching, and (c) the density correction is effective to enhance possible interval changes in a resulting image, since it produces a uniform background. The automated registration programs were modified to apply the density correction as a preprocessing technique. Subtraction images of 20 pairs (18 with interval changes and two with no change) were produced using the automated image registration technique including a non-linear density correction.

The resulting images were printed on 8"×10" films by using a laser film printer. The average processing time was approximately 35 minutes with a VAX station 3500. The results have shown that most images showed excellent registration. Two samples showed significant misregistrations, one of which was due to severe A-P inclination, and the other due to an incorrect selection of search area ROIs. The subtraction images appeared to enhance various interval changes much better than the manual registration method, which had been previously tested. This technique also may be useful to identify negative cases. The subtraction images for pairs with no change are extremely uniform in density, compared with those which show interval change. In order to quantitatively analyze the cross-correlation values obtained in the local matching process, a program has been written to perform this analysis. The cumulative histogram of those values are calculated, and the locations of templates with smaller cross-correlation values are indicated on an original image. The 20 experimental pairs were analyzed using this program, and it was found that templates located around certain regions generally showed poor correlations. These regions were (a) large lesions with interval changes, (b) borders of the heart or diaphragm with interval changes, (c) large infiltrates with or without interval changes, (d) devices, (e) clavicals with changing angles, (f) extremely low density areas, and (g) whole lung areas of pairs of images with severe A-P inclination.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for computerized analysis of temporally sequential images, comprising:
    obtaining first and second images of a patient;
    aligning corresponding portions of said first and second images in relation to corresponding anatomical features present in said first and second images, including performing cross-correlation mapping to produce a plurality of shift values indicative of differences in locations between corresponding anatomical features of said first and second images with respect to corresponding pixel locations of said first and second images, mathematically fitting a predetermined surface to said shift values for correcting said shift values in order to compensate for errors introduced into said cross-correlation mapping, and shifting the anatomical features in one of said first and second images based on the corrected shift values;
    performing subtraction processing between said first and second images; and
    determining differences between said first and second images indicative of abnormal changes which have occurred in said patient during the time interval between the taking of said first and second images.

2. The method according to claim 1, wherein said step of performing cross-correlation mapping comprises:
    selecting a template region of interest (ROI) in one of said first and second images and a search area ROI in the other image, wherein said search area ROI is larger than said template ROI;
    determining cross-correlation values between said template region in said one image and plural subregions at different positions within said search area ROI in said other image;
    determining which subregion of said search area ROI in said other image results in a maximum cross-correlation value with respect to said template ROI in said one region; and
    determining said shift values for said template ROI based on the difference in location between the position of the template region in said one image and the position in the other image of said subregion of said search area ROI which results in the maximum cross-correlation value with respect to said template ROI.

3. The method according to claim 2, wherein said step of fitting said predetermined surface to said cross-correlation mapping of shift values comprises:
    using a two-dimensional nth order polynomial function with weighting coefficients ranging from 0.0 to 1.0.

4. The method according to claim 3, wherein said step of fitting said predetermined surface comprises:
    selecting said weighting coefficients based on the maximum cross-correlation values determined in said step of cross-correlation mapping.

5. The method according to claim 3, wherein said step of using a two-dimensional nth order polynomial function comprises:
    selecting a weighting coefficient close to or equal to 1.0 for highly correlated portions of the first and second images obtained by said cross-correlation mapping, and 0.0 or a value close to 0.0 as a weighting coefficient for portions of the first and second images which have little correlation.

6. The method according to claim 3, further comprising:
    using a look-up table for generating said weighting coefficients.

7. The method according to claim 1, further comprising:
    displaying an output image representative of a subtraction image obtained by said subtraction processing.

8. A system for computerized analysis of temporally sequential digitized chest images, comprising:
    means for obtaining first and second digitized chest images of a patient;
    means for aligning corresponding portions of said first and second images in relation to corresponding anatomical features present in said first and second images, including means for performing cross-correlation mapping to produce a plurality of shift values indicative of differences in location between corresponding anatomical features of said first and second images with respect to corresponding pixel locations of said first and second images, means for mathematically fitting a predetermined surface to said shift values for correcting said shift values in order to compensate for errors introduced into said cross-correlation mapping, and means for shifting the anatomical features in one of said first and second images based on the corrected shift values;

means for performing subtraction processing between said first and second images, whereby differences between said first and second images are determined which indicate abnormal changes which have occurred in said patient during the time interval between the taking of said first and second images.

9. The system according to claim 8, wherein said means for performing cross-correlation mapping comprise:

means for selecting a template region of interest (ROI) in one of said first and second images and a search area ROI in the other image, wherein said search area ROI is larger than said template ROI;

means for determining cross-correlation values between said template ROI in said one image and plural subregions at different positions within said search area ROI in said other image;

means for determining which subregion of said search area ROI in said other image results in a maximum cross-correlation value with respect to said template ROI in said one region; and means for determining said shift values for said template ROI based on the difference in location between the position of the template region in said one image and the position in the other image of said subregion of said search area ROI which results in the maximum cross-correlation value with respect to said template ROI.

10. The system according to claim 9, wherein said means for fitting said predetermined surface comprises:

means for applying a two-dimensional nth order polynomial function to said cross-correlation mapping of said shift values using weighting coefficients ranging from 0.0 to 1.0.

11. The system according to claim 10, wherein said means for fitting said predetermined surface comprises:

means for selecting said weighting coefficients based on the maximum cross-correlation values.

12. The system according to claim 10, wherein said means for applying a two-dimensional nth order polynomial function comprises:

means for selecting a weighting coefficient close to or equal to 1.0 for highly correlated portions of the first and second images obtained by said cross-correlation mapping, and 0.0 or a value close to 0.0 as a weighting coefficient for portions of the first and second images which have little correlation.

13. The system according to claim 10, further comprising:

look-up table means for generating said weighting coefficients.

14. The system according to claim 8, further comprising:

means for displaying an output image representative of a subtraction image obtained by said subtraction processing.

* * * * *

UNITED STATES PATENT AND TRADEMARK OFFICE
CERTIFICATE OF CORRECTION

| | |
|---|---|
| PATENT NO. | : 5,359,513 |
| APPLICATION NO. | : 07/981471 |
| DATED | : October 25, 1994 |
| INVENTOR(S) | : Akiko Kano et al. |

It is certified that error appears in the above-identified patent and that said Letters Patent is hereby corrected as shown below:

Col. 1, delete lines 6-10, and insert --This invention was made with U.S. Government support under grant numbers CA 024806 and CA 047043 awarded by the National Institutes of Health (NIH). The U.S. Government has certain rights in the invention.--

Signed and Sealed this

Second Day of September, 2008

JON W. DUDAS
*Director of the United States Patent and Trademark Office*